(12) United States Patent
Murai et al.

(10) Patent No.: US 7,107,482 B2
(45) Date of Patent: Sep. 12, 2006

(54) PROGRAM UPDATE APPARATUS AND METHOD

(75) Inventors: Kenichi Murai, Kyoto (JP); Mitsuaki Hirono, Kyoto (JP)

(73) Assignee: OMRON Corporation, Kyoto (JP)

( * ) Notice: Subject to any disclaimer, the term of this patent is extended or adjusted under 35 U.S.C. 154(b) by 546 days.

(21) Appl. No.: 10/091,369

(22) Filed: Mar. 5, 2002

(65) Prior Publication Data

US 2002/0194527 A1     Dec. 19, 2002

(30) Foreign Application Priority Data

Mar. 5, 2001    (JP) .............................. 2001-060598
Mar. 1, 2002    (JP) .............................. 2002-056451

(51) Int. Cl.
   *G06F 11/00*    (2006.01)
   *G06F 9/44*     (2006.01)

(52) U.S. Cl. ........................... 714/6; 717/168; 717/170

(58) Field of Classification Search .................... 714/6; 717/168, 170
   See application file for complete search history.

(56) References Cited

U.S. PATENT DOCUMENTS 6,195,695 B1 *  2/2001  Cheston et al. ............. 709/221
6,393,585 B1 *  5/2002  Houha et al. ................. 714/23
6,728,896 B1 *  4/2004  Forbes et al. .................. 714/4
6,728,956 B1 *  4/2004  Ono ............................ 717/168
6,934,881 B1 *  8/2005  Gold et al. .................... 714/15
2002/0042892 A1 *  4/2002  Gold ............................. 714/6
2002/0092010 A1 *  7/2002  Fiske ........................ 717/168
2002/0170050 A1 * 11/2002  Fiorella et al. ............. 717/168
2003/0037279 A1 *  2/2003  Laio .............................. 714/6
2003/0126493 A1 *  7/2003  Lee ................................ 714/6
2004/0153724 A1 *  8/2004  Nicholson et al. ............. 714/6
2004/0153834 A1 *  8/2004  Oshima et al. ............... 714/38

* cited by examiner

*Primary Examiner*—Robert Beausoliel
*Assistant Examiner*—Christopher McCarthy
(74) *Attorney, Agent, or Firm*—Osha Liang LLP

(57) ABSTRACT

The present invention is to provide a program update apparatus which carry out an updating process automatically in a device built-in system (in particular, in a system for an apparatus that needs to be always operated), and makes the system free from freezing. A downloaded new operation program is stored in a storage area that is separated from a storage area in which a previous operation program that has been operated is stored. Then, the new operation program 24 is activated so that an execution application is operated on the new operation program 24. In the event of a failure in activating the new operation program, the previous operation program is reactivated so that the system is operated on the previous operation program 21. Moreover, in a state where the new operation program or the previous operation program is successfully activated, if the execution application is not activated, the setting required for the execution application is recovered by a recovering application.

2 Claims, 26 Drawing Sheets

PROGRAM UPDATE APPARATUS AND METHOD

BACKGROUND OF THE INVENTION

The present invention relates to a program update apparatus and a program update method. In particular, the present invention concerns a program update apparatus and an update method thereof, which is used for a bug fixing process and a version-up process of an apparatus built-in system.

In programs of a system such as an apparatus built-in system, a bug fixing process for eliminating bugs and a version-up process for improving a program and for updating data are sometimes required. For this reason, in a conventional system, a program re-writing process in an apparatus built-in system, etc. is sometimes carried out.

FIG. 1, for example, shows a case of a home-use consumption measuring device for measuring energy consumption. The energy consumption measuring device 1 is placed on an outer wall or the like of a house, and energy is supplied to apparatuses 3 for use in the home 2 through a first energy supply line 4, a second energy supply line 5, etc. via the consumption measuring device 1. For example, energy, supplied through the first energy supply line 4, is electricity, and the consumption measuring device 1 measures and calculates the consumption of electricity. Moreover, energy, supplied through the second energy supply line 5, is gas, and the consumption measuring device 1 measures and calculates the consumption of gas.

The objective of such a consumption measuring device is to measure the consumption of energy such as electricity and gas, and these data are used for purposes other than collection of rates. For example, when a detailed consumption trend on an hour basis for a day or a week is obtained, based on the data, the energy supplier can set a detailed charge system on an hour basis for each of the energy consumers, thereby making it possible to improve the service. Moreover, by setting a higher energy consumption charge during a time zone corresponding to a consumption peak, it becomes possible to reduce the gross consumption of energy, and consequently to prevent an energy supply shortage due to concentration of energy consumption onto a specific time zone.

In order to carry out the collection of rates and to effectively use the data as described above, the energy supplier needs to read a meter of a consumption measuring device in each home to check the energy consumption. For this reason, a measurer (inspector), dispatched from a control center (an energy supplier such as an electric company or a gas company) visits each home to read the meter of each consumption measuring device. However, in such a meter reading method for the consumption measuring device in each home using handwork, the number of homes on which meter-reading operations can be conducted per day is limited, and personnel expenses become higher, resulting in low efficiency.

For this reason, a system has been proposed in which the meter-reading operations are automatically carried out on consumption measuring devices placed in respective homes from a remote place. In such a prior-art system, as shown in FIG. 2, a data-collecting device 9 is placed on an electric pole 8 or the like, and the consumption measuring device 1 of each home 2 is connected to the control center 6 through the data collecting device 9. The data collecting device 9 is a device having such a function that data is collected from the consumption measuring device 1 of each home on 2 a fixed time basis to send the resulting data the control center 6. The data collecting device 9 is attached to an inaccessible place for people such as an electric pole 8 because of availability of a power-supply, less interrupting objects in terms of electric waves, and prevention of human touch. The data collecting device 9 is normally connected to the consumption measuring device 1 of each home 2 as well as to the control center 6 through communication lines 10, 11, etc.

Such a system makes it possible to automatically inspect consumption measuring devices of many homes from a remote place (control center 6), to cut personnel expenses, and consequently to eliminate the limit of the number of meter-reading operations per day; thus, it becomes possible to carry out the meter-reading operations efficiently.

Moreover, the following description will exemplify another case in which a device installed in a house is operated from outside. In an example shown in FIG. 3, devices 12A, 12B, installed in a home 2 are connected to a device control unit 14 through signal lines 13, and the respective devices 12A, 12B are operated outside the home 2 through the device control unit 14 connected to a communication line 15 such as a telephone line and a network outside the home 2, or information from the devices 12A, 12B is obtained from outside. For example, in the case when the device 12A is a monitor camera, the image of the monitor camera is monitored from outside by using a mobile computer connected to a telephone line or a mobile telephone, or the image-pickup direction of the monitor camera can be operated, and in the case when the device 12B is a video recorder, a recording reservation of the video recorder can be carried out from outside. In the case when a device 12C is a monitoring sensor required for home security, information from the security system can be obtained outside the home even from a remote place.

Various devices are proposed as such devices connected to the device control unit 14, and pieces of information are different depending on the respective devices, with the result that the system program of the device control unit 14 needs to be rewritten for each of the devices.

Moreover, in the case when those devices are used in a system related to home security, the device control unit 14 should be maintained without freezing during a home security operation. Freezing refers to a state in which no response is received from the device causing incapability of informing the state externally or incapability of receiving inputs from outside. The home security refers to a system for detecting an invasion of any dubious character, a fire, a gas leak, any emergency information, or any emergency or rescue situation, and when any freeze occurs in the device control unit 14, the home security system no longer functions, causing degradation in the reliability of the device control unit 14.

The following description will discuss technical problems with the device built-in system externally connected through communication lines, for example, devices such as the above-mentioned data collector and device control unit.

In the data collector 9 and the device control unit 14, a bug is sometimes found in the system (operation program), and in such a case, any bug fixing operation is required in the system program. Moreover, when any new device (for example, a consumption measuring device 1) is added and connected to the data collector 9 and the device control unit 14, the corresponding functions need to be added to the respective system programs, or the respective system programs need to be updated (renewed). Here, in order to upgrade the programs for bug fixing or addition of new functions., the program of the built-in system inside the data collector 9 and the device control unit 14 need to be re-written.

In the case when such a program re-writing process is required, for example, if an updating program is supplied to the user so as to have the user rewrite the program, it is not possible to expect the user to properly rewrite the program or to carry out a recovering process of a frozen program, in the case when he or she is poor at mechanics. Moreover, in most cases, individual data collectors 9 and device control units 14 are located at remote places from the program supplier (managing center, etc.), and the data collectors 9 and the device control units 14 also tend to be placed at inaccessible places (on electric posts, etc.). Therefore, when the rewriting process of the system program is required, it is necessary to automatically carry out a rewriting process through communication lines, etc. without the necessity of handwork.

Moreover, in the case of device control unit 14, etc. related to home security, it is not possible to stop the system for the rewriting process, and it is necessary to carry out the rewriting process while the system is being operated; therefore, even in the case when the system is frozen during the rewriting process, it is necessary to reactivate the system as a temporary measure and to operate the system.

Therefore, depending on device built-in systems, there have been demands for an updating method in which a program rewriting process is automatically carried out through communication lines, etc. and the system is free from freezing even in the event of an emergency situation.

Even in an conventional system, a program rewriting process of a device built-in system is carried out through a communication line. However, this process is carried out on the premise that a program is operated correctly, and only a check is made as to whether or not the rewriting process has been done correctly. For this reason, no rewriting process is carried out on an essential portion. Further, in the case when only the checksum is utilized for checking the program, in the event of a plurality of errors, the value to be checked might coincide with a correct value, resulting in a possibility of erroneous recognition of a correct rewriting operation.

Moreover, in the conventional rewriting system, it is not possible to properly deal with a program having any bug, and complicated processes such as network downloads cannot be carried out unless the operation system is operated.

SUMMARY OF THE INVENTION

The objective of the present invention is to provide a program update apparatus and an update method, which carry out an updating process automatically in a device built-in system (in particular, in a system for an apparatus that needs to be always operated), and makes the system free from freezing.

The program update apparatus of the present invention, which is a program update apparatus which updates an operation program through a memory device or a communication line, is provided with a means for maintaining a second storage area that is separated from a first storage area in which an operation program is stored, a means for storing a second operation program in the second storage area in a separate manner from the first operation program stored in the first storage area, a selective activating means for selectively activating either the first operation program or the second operation program, a failure detecting means which detects a failure in the activation of an operation program selected to be activated or an application program that is operated on the operation program, and a recovering application which alters a setting required for the operation of the above-mentioned application program, and in the case when the failure detecting means detects any failure in the activation of the operation program to be selected for activation, another operation program is selected to be activated, and in the case when the failure detecting means detects any failure in activation of the application program, the recovering application is used for recovering the setting required for the operation of the above-mentioned application program. In this case, the operation program refers to a program that controls the apparatus and the application, and includes an operating system (OS). Moreover, the memory device is not particularly limited as long as it is a memory that is connected to a program update apparatus, and includes a memory card, a memory stick, etc. The communication line may be a cable or radio, and for example, the Internet and a network (communication network) by means of mobile telephones and PHS (Personal Handy-phone System) may be used for this purpose.

In this program update apparatus, with the operation program that has been operated immediately before remaining in one of the first and second storage areas, a new operation program is downloaded in the other storage area, and either one of the operation programs stored in the first storage area and the second storage area is selectively activated so that, after a new operation program has been downloaded in either one of the storage areas, in the case when there is a failure in activating the operation program, the previous operation program, stored in the other storage area, can be reactivated; therefore, even when there is a failure in updating the operation program, it is possible to avoid the device having the built-in operation program from freezing. Moreover, even in the case when, after the operation program has been activated, the new operation program is not well compatible with the application program with the result that the application program is not operated, the inoperability of the application program is detected, and the recovering application carries out setting required for operating the application program so that the application program is operated. Moreover, in this program update apparatus, it is possible to automatically carry out an updating operation even from a remote place through a communication line. Therefore, this program upgrade apparatus makes it possible to automatically upgrade the operation program even from a remote place, and also to prevent the system from freezing even in the event of a failure in the updating process.

Moreover, the above-mentioned program upgrade apparatus is also provided with an informing means which gives information to an external device outside the program upgrade apparatus, and in the case when the updating process of the above-mentioned operation program is not carried out correctly, by the above-mentioned in forming means, the information indicating the incorrect updating process is preferably given to an external device outside the above-mentioned program upgrade apparatus. Here, the informing means may be a means for outputting through a communication line, or a display device for informing the corresponding message, or both of the means and device. With this arrangement, in the case when the operation is being carried out while the operation program has not been updated after a failure in the updating process, the program update apparatus gives the corresponding information to the side that sends updating data so that it is possible to again carry out the updating process.

DETAILED DESCRIPTION OF THE PREFERRED EMBODIMENTS

Figure 1:
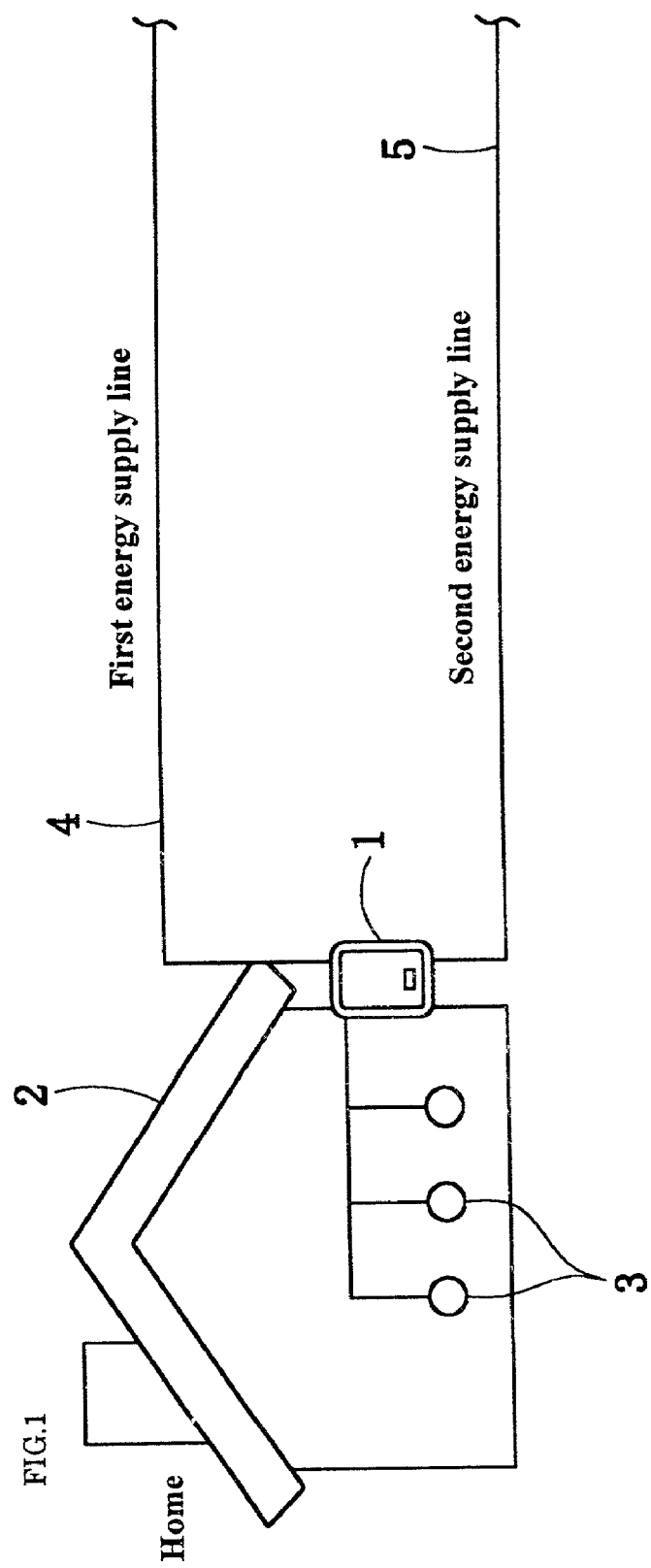
FIG. 1 is a drawing that shows a consumption state of a home-use consumption measuring device for measuring the energy consumption.
Figure 2:
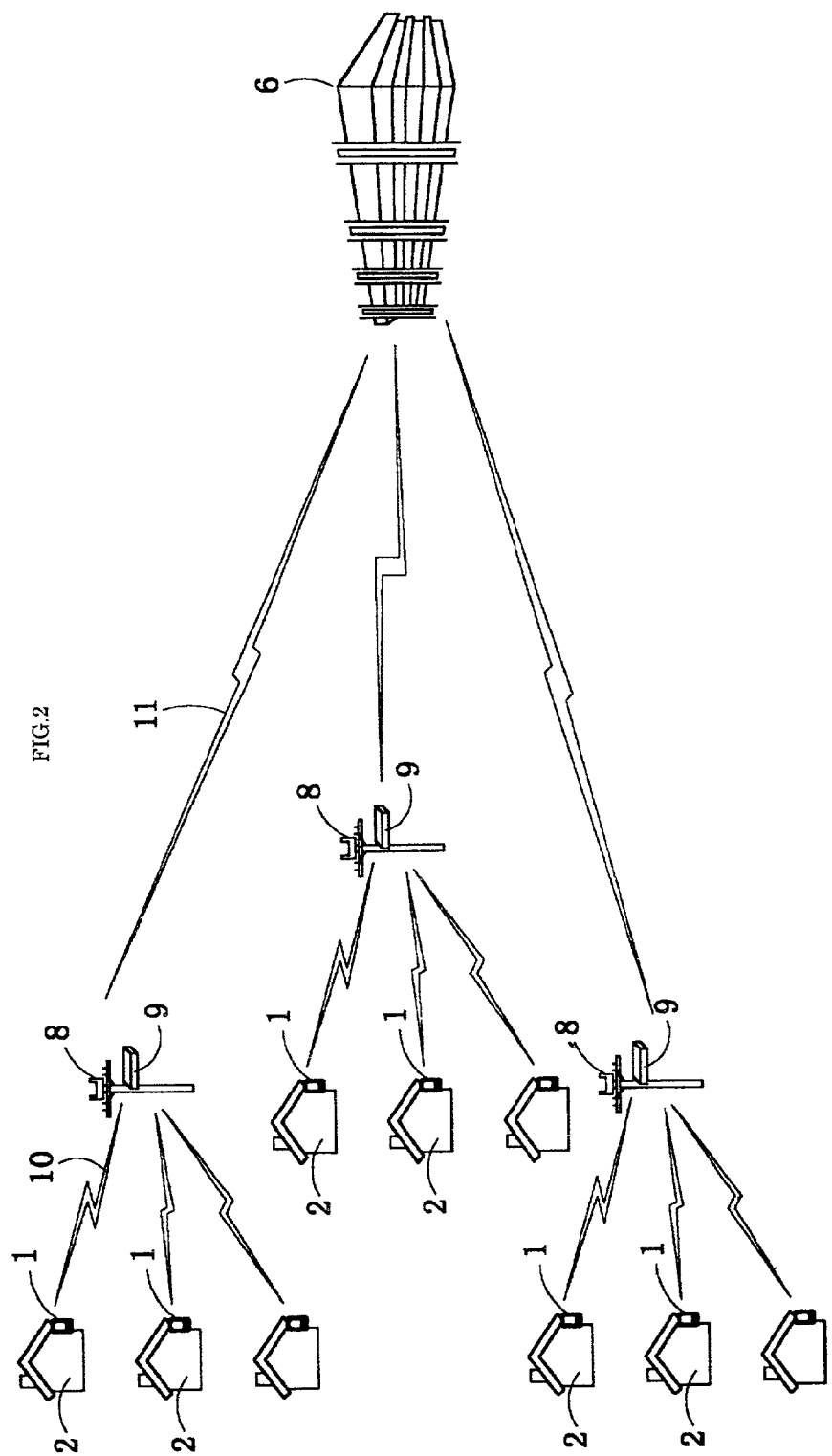
FIG. 2 is a drawing that explains a construction in which an automatic meter-reading operation of the consumption measuring device placed in a home is carried out from a remote place.
Figure 3:
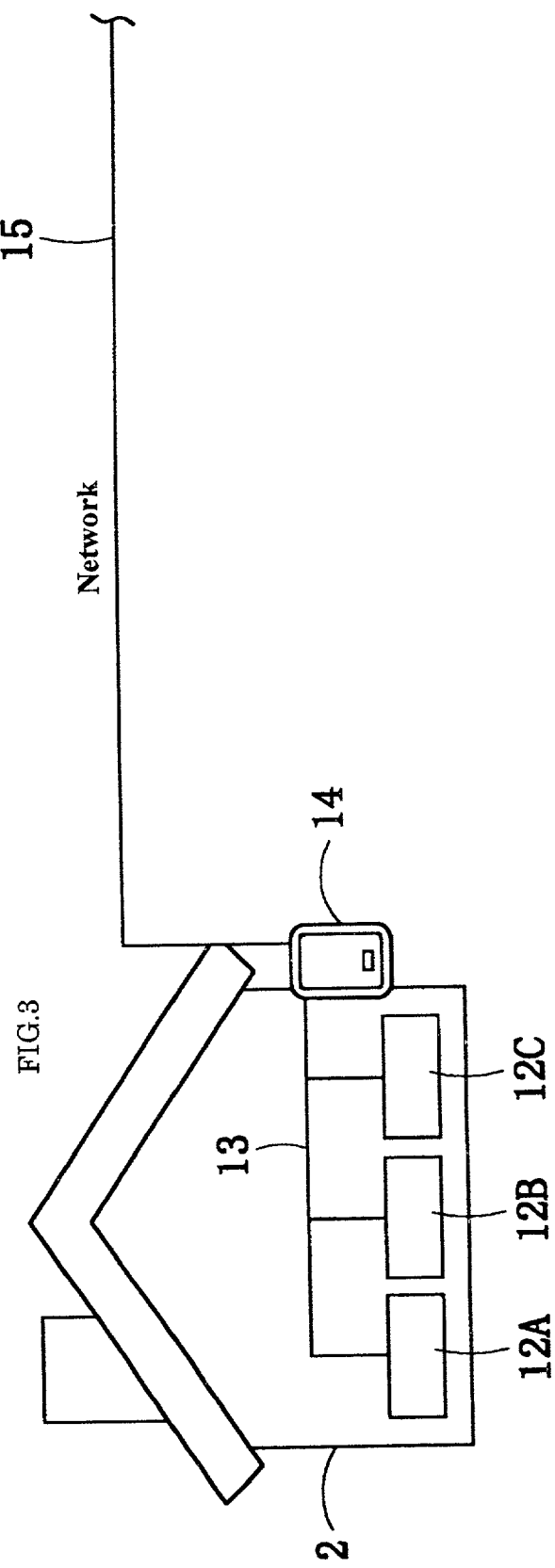
FIG. 3 is a drawing that explains a device control unit which operates the device placed inside a home from outside.
Figure 4:
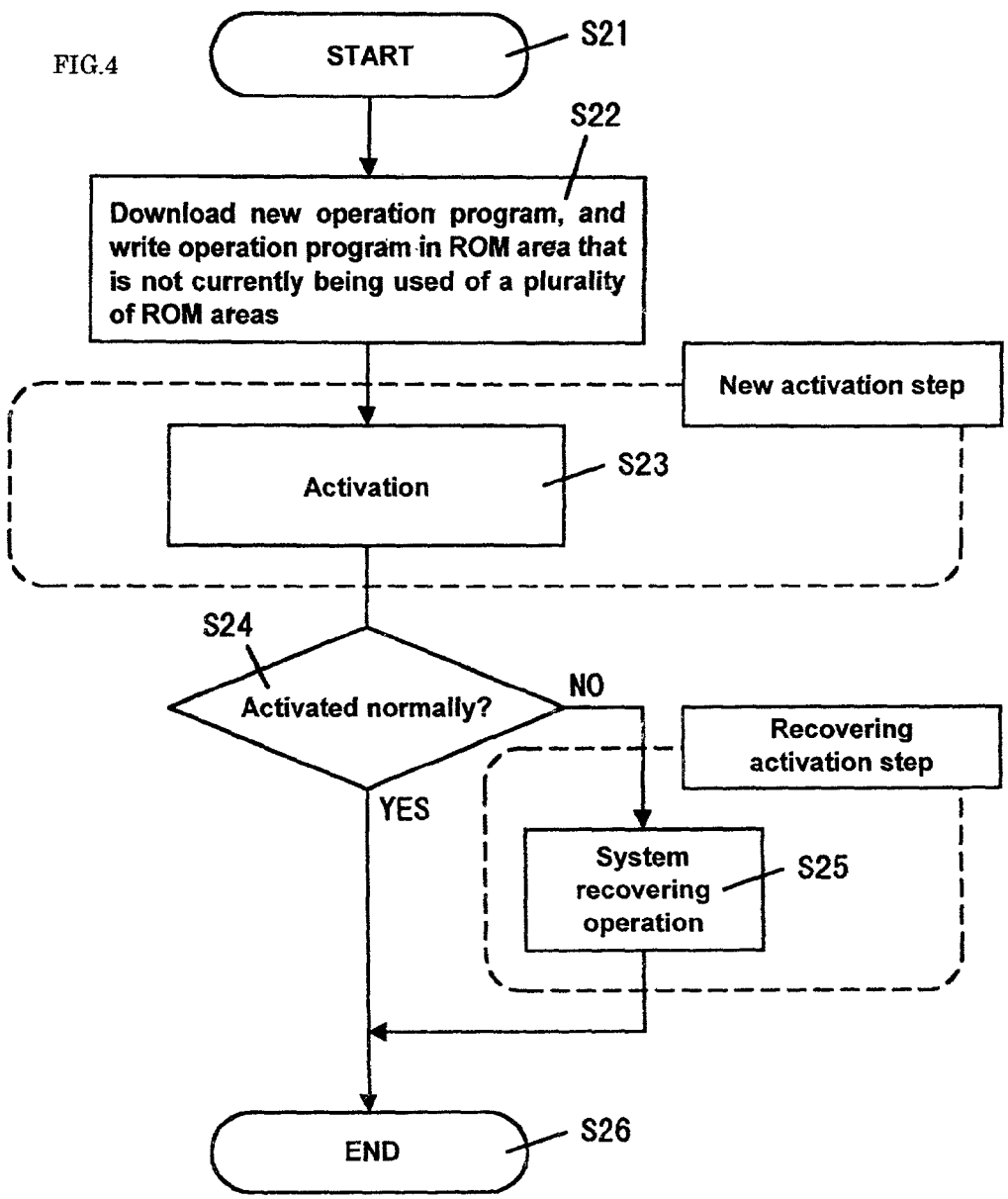
FIG. 4 is a flow chart that shows a sequence of operation processes of a program updating system in accordance with the present invention.

As shown in FIG. 4, a program update system of the present invention is mainly constituted by a download step (step S22), ea new activation step (step S23) and a recovery activation step (step S25). When an updating process of a system is initiated (step S21), a new operation program (an updated operation program) is downloaded in the system, and the new operation program is transferred to a space area in a storage device that is an area different from a program-operation-use area within the system (for example, a ROM area in which the previous operation program is not being operated among a plurality of ROM areas), and written therein (download step, step S22) When the new operation program has been downloaded and the transferring and writing operations have been completed, the downloaded new operation program is activated in place of the previous operation program that was being operated during the downloading operation (new activation step, step S23) Then, a determination is made as to whether or not the new operation program is activated correctly (step S24), and if the new operation program is being operated correctly, it is determined by a normal resolving function that the updating process has been completed, thereby completing the updating operation (step S26).

In contrast, in the case when at step S24, it is determined that the new operation program is not activated correctly, a system recovering operation, which includes a recovering trial function and an ensured recovering function, is carried out to re-activate the system so that the system is recovered from a freezing state (recovering activation step, step S25), thereby completing the updating operation (step S26). In this case, there are two cases in which the system has been updated to the new operation program and in which it has returned to the previous operation program so as to ensure the operation. In the case when the previous operation program, as it is, is operated, the corresponding information is given to an external device outside the program update apparatus through a communication line or a display, etc., and the system enters a waiting state for the next updating operation of the new operation program.

Here, the above-mentioned normal resolving function refers to a function which activates the downloaded new operation program correctly, and allows the system to be operated based upon the new operation program after the operation program of the system has been switched from the previous operation program to the new operation program, and the recovering trial function and the ensured recovering function refer to functions which, in the case when the downloaded new operation program, etc., are not activated correctly, recovers the system without being frozen.

Thus, in the program update system in accordance with the present invention, the new operation program is downloaded in a system in which the previous operation program is being operated, and the program to be operated is switched from the previous operation program to the new operation program so that the new operation program is executed. Here, in the event of a failure in activating the new operation program due to freezing etc., the previous operation program is reactivated so that the previous program is executed. Alternatively, in the case when the executing application is stopped in execution due to freezing, etc., while the previous operation program or the new operation program is being operated, a recovering application is executed so as to recover the executing application. Here, the operation program refers to a program for controlling the device and the application, and also includes the operating system (OS). Moreover, the previous program refers to an operation program that is being operated during the execution of downloading, and the new operation program refers to an operation program (updating program) to be used for substitution. The executing application refers to an application program which is operated on the operation program, and executes the application purposes of the device. The recovering application refers to a minimum application program which is required for recovering functions on the operation program, and used for carrying out settings for operating the application program on the operation program. In this updating operation, the program updating operation is carried out from a remote system so that the program is downloaded through a communication line. The communication line may be a cable or radio, and for example, the Internet and a network (communication network) by means of mobile telephones and PHS (Personal Handy-phone System) may be used for this purpose.

Figure 5:
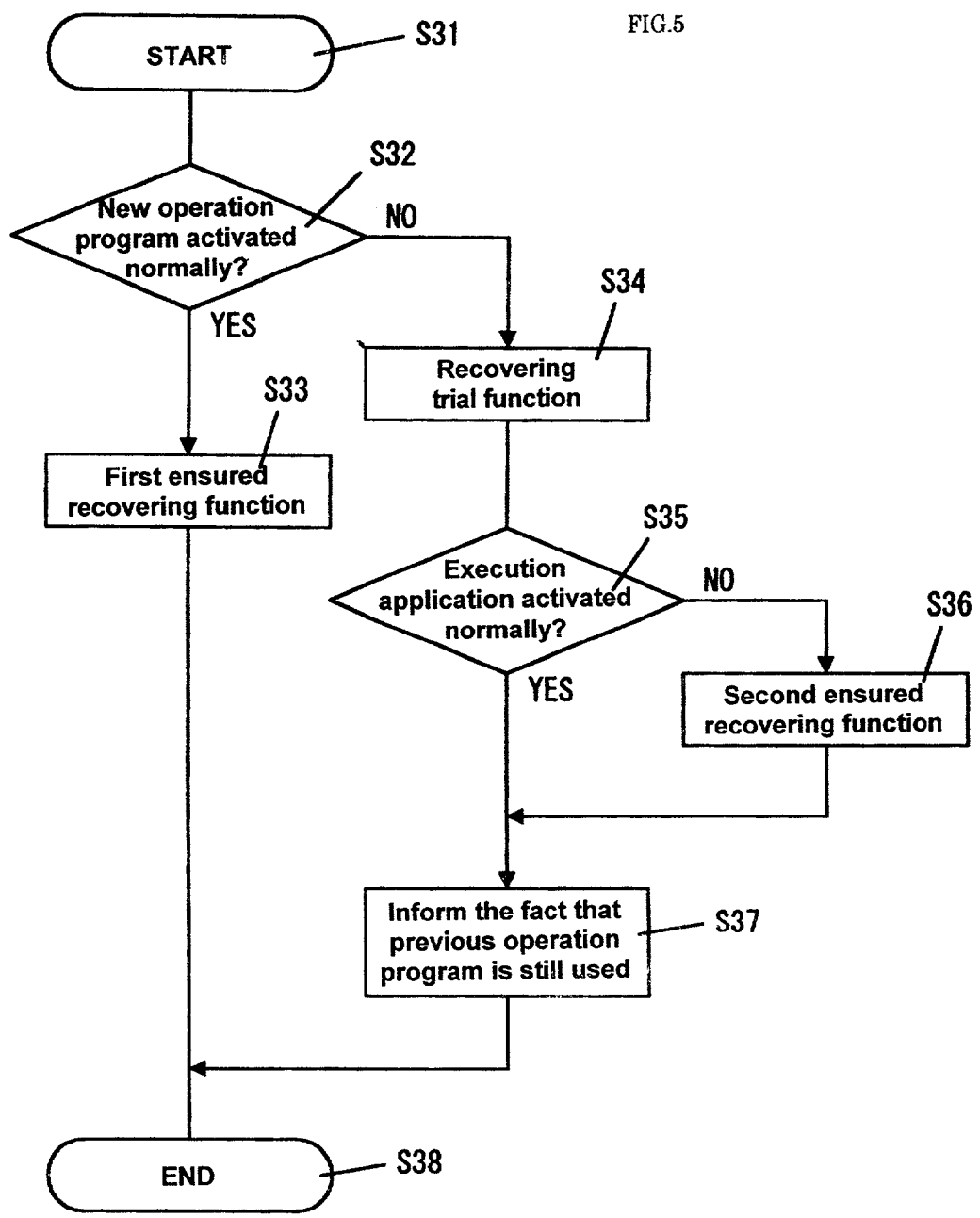
FIG. 5 is a flow chart that shows a recovering activation step of FIG. 4 in detail.

Here, system freezing occurs in the following cases: (1) the downloaded operation program is broken, (2) data such as initializing data is broken, or (3) even when the operation program is operated normally, the executing application is not activated normally, and the update system of the present invention makes it possible to avoid system freezing as explained below:

FIG. 5 is a flow chart that explains the system recovering operation (recovering activation step, step S25) in detail. In the case when the new operation program is not activated normally, a recovering activation step is initiated (step S31) First, a determination is made as to whether or not the new operation program is operated normally (step S32), and in the case when the new operation program is normally operated, since the execution application is not operated, the recovering application is activated by the first ensured recovering function so that the execution application is recovered to an executable state (step S33), thereby completing the operation (step S38). In the case when the new operation program is not operated normally at step S32, the system is activated based upon the previous operation program by using the recovering trial function (step 34). Since the previous operation program is a program that has been used until this updating operation, it is certain that the system will be activated. It is determined whether or not the execution application is activated on the previous operation program (step S35), and if the execution application is activated, information indicating that the system is operated by using the previous operation program, as it is, is given (step S37), thereby completing the operation (step S38). If the execution application is not activated on the previous operation program, the setting for activation might be changed by the new operation program; therefore, the recovering application is activated by using the second ensured recovering function so that the setting of the execution application is recovered to an executable stage (step S36), and information indicating that the system is operated by using the previous operation program, as it is, is given (step S37), thereby completing the operation (step S38).

Figure 6:
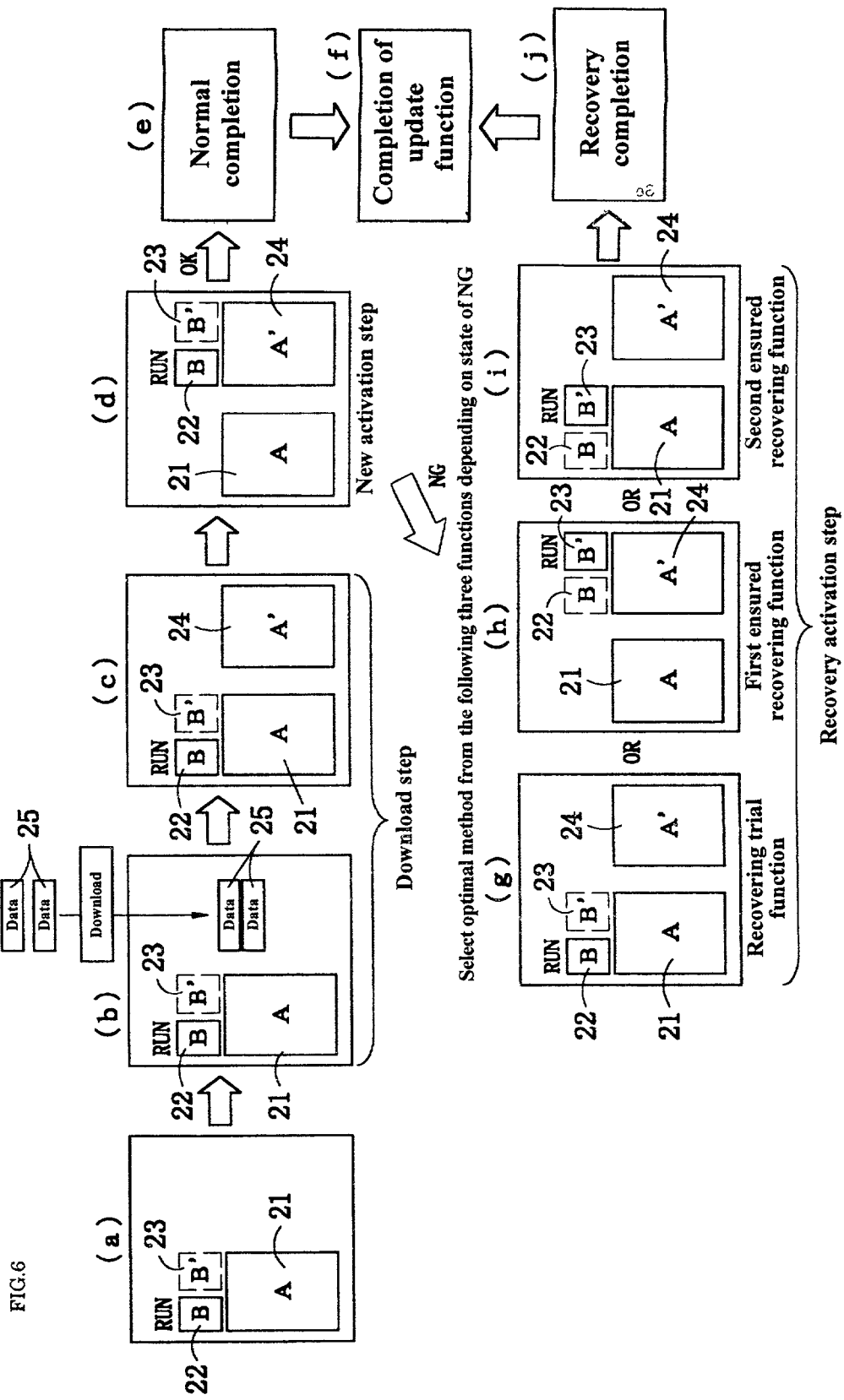
FIG. 6 is a drawing that specifically explains a program updating system of FIG. 4.

FIG. 6 is a drawing that specifically explains the above-mentioned method. FIG. 6(a) shows a state prior to the downloading process in which the execution application 22 is operated by a previous operation program 21 inside the system. Here, in FIG. 6, a symbol "RUN" represents an application in operation. When an updating operation is started, data 25 is downloaded through a communication line such as a network or a memory card, etc., as shown in FIG. 6(b), and as shown in FIG. 6(c), the new operation program 24 is transferred to a space area (for example, if there are a plurality of ROM areas, ROM1 and ROM2, with the area ROM1 being operated, it is transferred to the area of ROM2), and written therein. Upon completion of the writing process of the new operation program 24, as shown in FIG. 6(d), the new operation program 24 is activated from the written area (for example, the area of ROM2) by a normal resolving function so that the operation program is switched from the previous operation program 21 to the new operation program 24; thus, the execution application 22 is executed on the new operation program 24, and the recovering application 23 also becomes executable on the new operation program 24.

When the new operation program 24 is activated (new activation step), a determination is made as to whether the activation of the new operation program 24 is successful (OK) or not successful (NG), and if the downloading of the new operation program 24 has been completed normally and if the activation of the new operation program 24 is successful (FIG. 6(e)), the updating function is completed (FIG. 6(f)).

When the system is activated normally by the downloaded new operation program 24 through the normal resolving function in this manner, the system rewriting operation is completed without intervening the purposes of the apparatus (that is, without stoppage of the system) and the system rewriting operation is also carried out while the purposes of the apparatus are being executed simultaneously; thus, the objective of the present invention is achieved.

In contrast, when the activation of the new operation program 24 is not successful, a best-suited method is selected among the three kinds of system recovering functions including the recovering trial function and the first or second ensured recovering function based upon situations of failure, and the resulting method is executed. In other words, the recovering trial function refers to a function in which, upon failure of the activation of the new operation program 24 through the normal resolving function, as shown in FIG. 6(g), the previous operation program 21 is re-activated and the system is re-executed by using the previous operation program 21, without executing the downloaded new operation program 24 is not executed. Moreover, the first ensured recovering function refers to a function in which, in the case when, even if the new operation program 24 is activated normally through the normal resolving function, the activation of the execution application 22 is not successful, a recovering application 23 is executed to recover the execution application 22, as shown in FIG. 6(h), under a state where the downloaded new operation program 24 is activated. The second ensured recovering function refers to a function in which, in the case when, after failure of the activation of the new operation program 24 through the normal resolving function, the activation of the execution application 22 is not successful, although the previous operation program 21 has been recovered through the recovering trial function, a recovering application 23 is executed to recover the execution application 22, as shown in FIG. 6(i), under a state where the previous operation program 21 is activated. Here, the recovering application adjusts the setting so as to operate the execution application 22 on the previous operation program 21 or the new operation program 24. With respect to the situation of failure of the activation of the new operation program 24, in the case when the execution application 22 is frozen even though the new operation program 24 has been normally activated, the first ensured recovering function is executed to recover the execution application 22 (FIG. 6(h)) so that the execution application 22 is operated on the new operation program 24, thereby completing the updating function (FIG. 6(f)). Moreover, when the new operation program 24 is frozen, the recovering trial function is exerted to return the operation program from the new operation program 24 to the previous operation program 21 so that the previous operation program 21 is reactivated (FIG. 6(g)), and when the system comes to function normally, the recovering operation is completed (FIG. 6(j)), while the execution application 22 is operated on the previous program 21, thereby completing the updating function (FIG. 6(f)) Here, even in the case when the system is not recovered even after the recovering trial function has been activated, that is, in the case when, although the previous operation program 21 is reactivated normally, the execution application 22 is frozen, the second ensured recovering function is exerted to execute the recovering application 23 on the previous operation program 21 so that the execution application 22 is recovered (FIG. 6(i)), and the execution application 22 is executed on the previous operation program 21, thereby completing the updating function (FIG. 6(f)).

In this manner, even in the case when the normal resolving function results in a failure, the recovering trial function is used to reactivate the system by the previous operation program, or the ensured recovering function is used to recover the execution application through the recovering application; therefore, the objective of the present invention for preventing the system from freezing even when the activation of the new operation program is not successful is achieved. Here, the updating function is completed without freezing, and FIGS. 6(d) and 6(h) show states in which the objective of updating to the new operation program is completely achieved. In FIGS. 6(g) and 6(i), the operation is being carried out on the previous execution program, and in this case, the program update apparatus may give information indicating that the new operation program is not operated to the downloading end of the new execution program so as to request the re-downloading operation, or may wait for the downloading operation of the next execution program.

Figure 7:
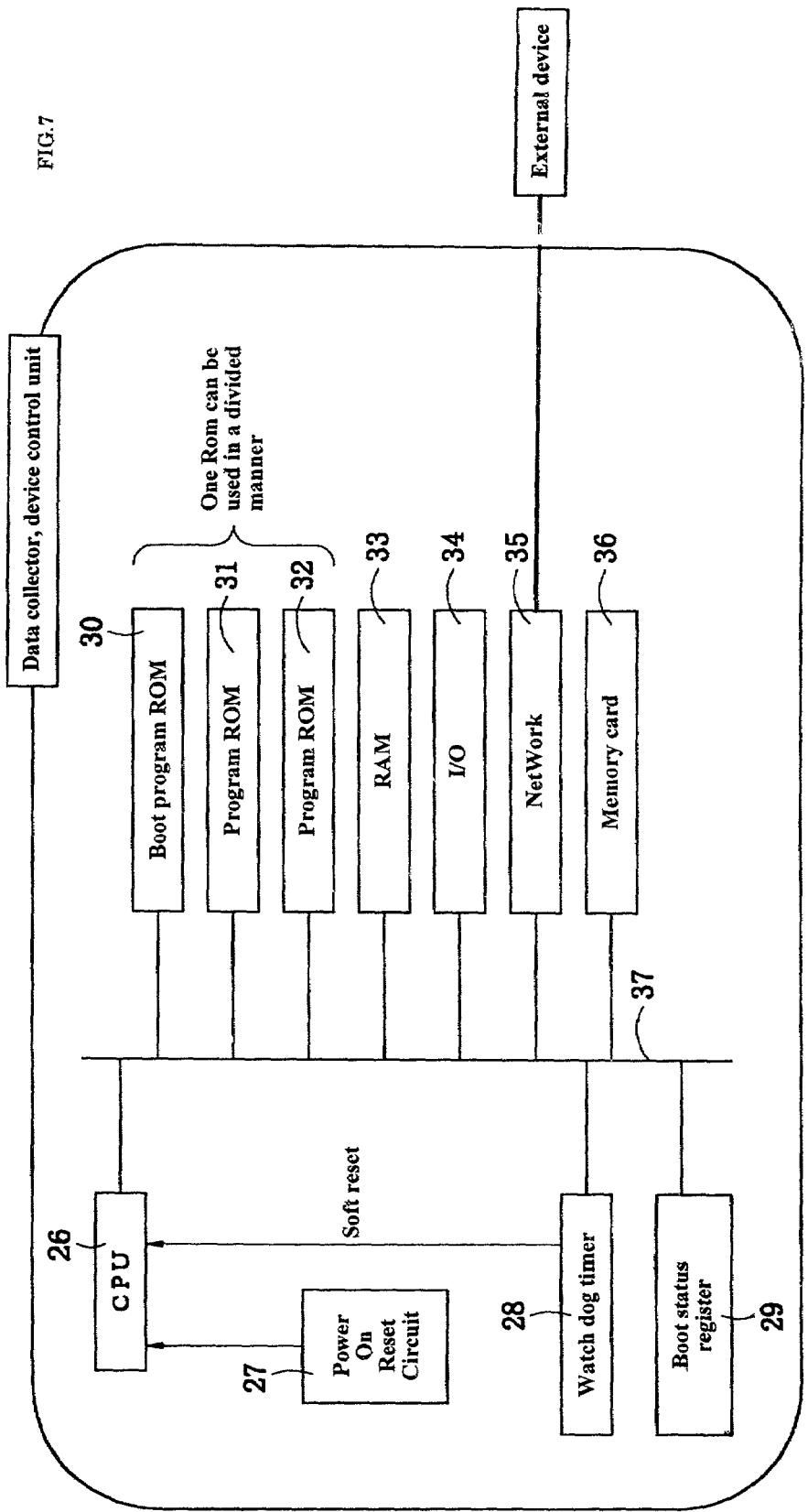
FIG. 7 is a drawing that shows a system construction for executing the program updating system in accordance with the present invention.

Next, FIG. 7 shows a system construction for executing the above-mentioned remote program updating system. This system, which is built in devices such as a data collecting device and a device control unit, is constituted by a microprocessor (CPU) 26, a Power On Reset circuit 27, a watch dog timer (WDT) 28, a boot status register 29, a boot program ROM30, program ROMs 31, 32, a RAM33, an input-output unit (I/O) 34, a network 35, a memory card 36, etc., and these devices are connected through a bus line 37. Here, the microprocessor 26 controls the entire system. The Power On Reset circuit 27 is used for turning on and off the system, or for carrying out a hardware resetting operation. The watch dog timer 28 is used for carrying out a software resetting operation when the system is time out. The boot program ROM 30 is a minimum boot program area. The program ROMs 31, 32 are duplicated program storing areas. The boot program ROM 30 and the program ROMs 31, 32 may be provided as divided areas of the same memory area. The RAM 33 temporarily stores data in such a case when the normal resolving function is executed. The network 35 is connected to an external system (public line, etc.) through the Internet or the like, and the new operation program is downloaded to either one of the program ROMs 31 and 32 through the network 35. Moreover, the new operation program 24 may be installed from the input-output unit 34 or the memory card 36.

Figure 8:
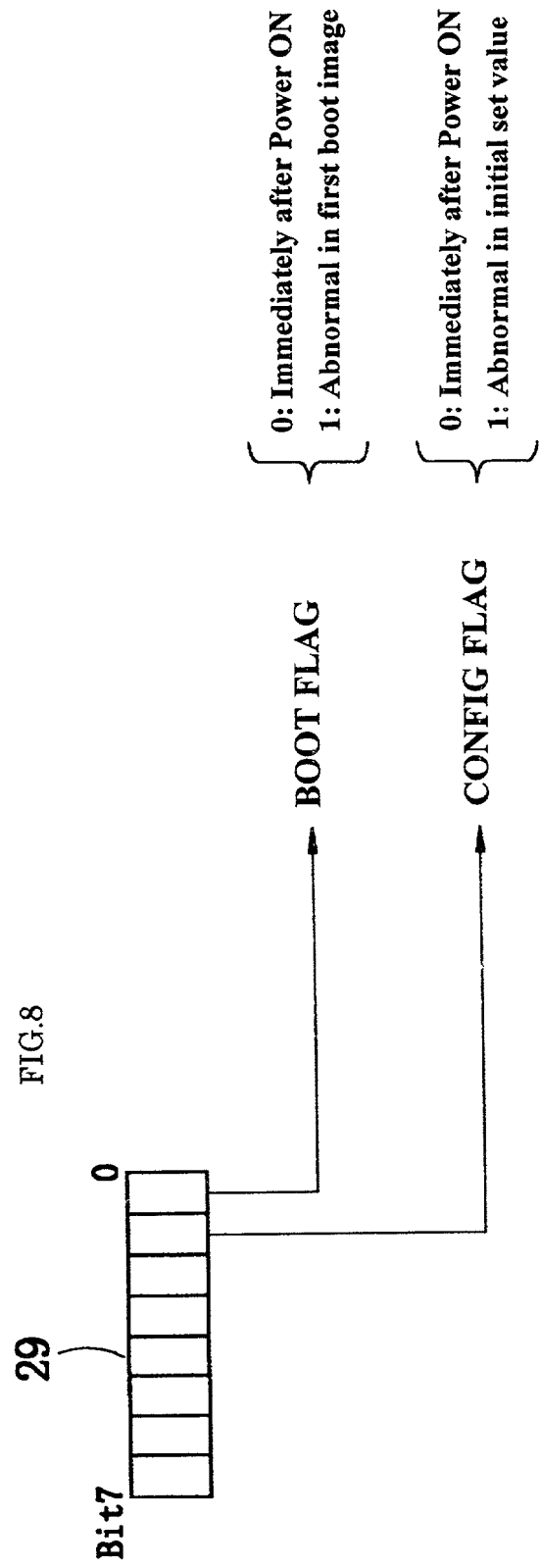
FIG. 8 is a drawing that shows a construction of a boot status register.

The boot status register 29 is a register for storing abnormal states of the operation program and the execution application that have been activated, and the values therein are not altered by the software resetting. As shown in FIG. 8, the boot status register 29 has a BOOT flag in the lowermost bit, and also has a CONFIG flag in the upper bit thereof. The BOOT flag is set to "0" immediately after the power-supply on, and when there is a first boot image abnormality, the value "1" is stored therein. Moreover, the CONFIG flag is set to "0" immediately after the power switch on, and where there is any abnormality in the initial set values, the value "1" is stored. When, upon activation of the new operation program 24, the system is subjected to a software resetting due to any abnormality in the new operation program 24, it checks the BOOT flag of the boot status register 29, and determines which ROM area is used for activating the operation program, the ROM area storing the previous operation program 24 or the ROM area storing the new operation program 24. Moreover, when the system is subjected to a software resetting due to any abnormality in the execution application 22, the system checks the CONFIG flag of the boot status register 29, and determines which application should be activated, the execution application 22 or the recovering application 23.

Figure 9:
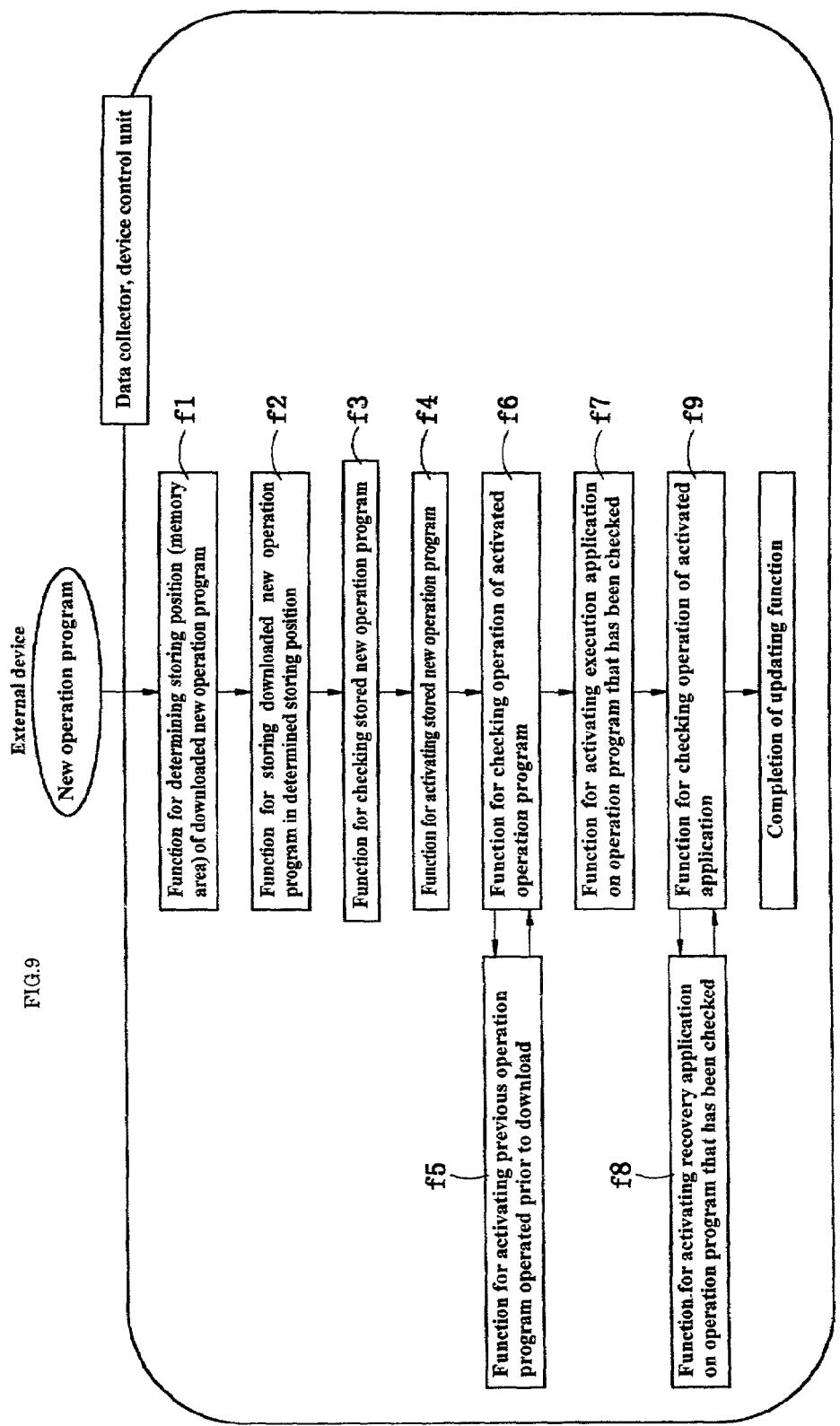
FIG. 9 is a drawing that represents functions of the system shown in FIG. 7.

FIG. 9 represents functions to be operated by the system shown in FIG. 7 based upon respective programs. These functions include:

(f1) function for determining a storing place (memory area) of the downloaded new operation program 24;

(f2) function for storing the downloaded new operation program 24 to the determined storing place;

(f3) function for checking the stored new operation program 24;

(f4) function for activating the stored new operation program 24;

(f5) function for activating the previous operation program 21 that had been operated before the downloading operation;

(f6) function for checking the operation of the new operation program 24 or the previous operation program 21 that has been activated;

(f7) function for activating the execution application 22 on the operation program that has been checked;

(f8) function for activating the recovering application 23 on the operation program that has been checked; and (f9) function for checking the operation of the execution application 22 or the recovering application 23 that has been activated.

These functions are executed starting with the downloading of the new operation program 24, successively in the order indicated by arrows in FIG. 9, and finished upon completion of the updating functions.

Figure 10:
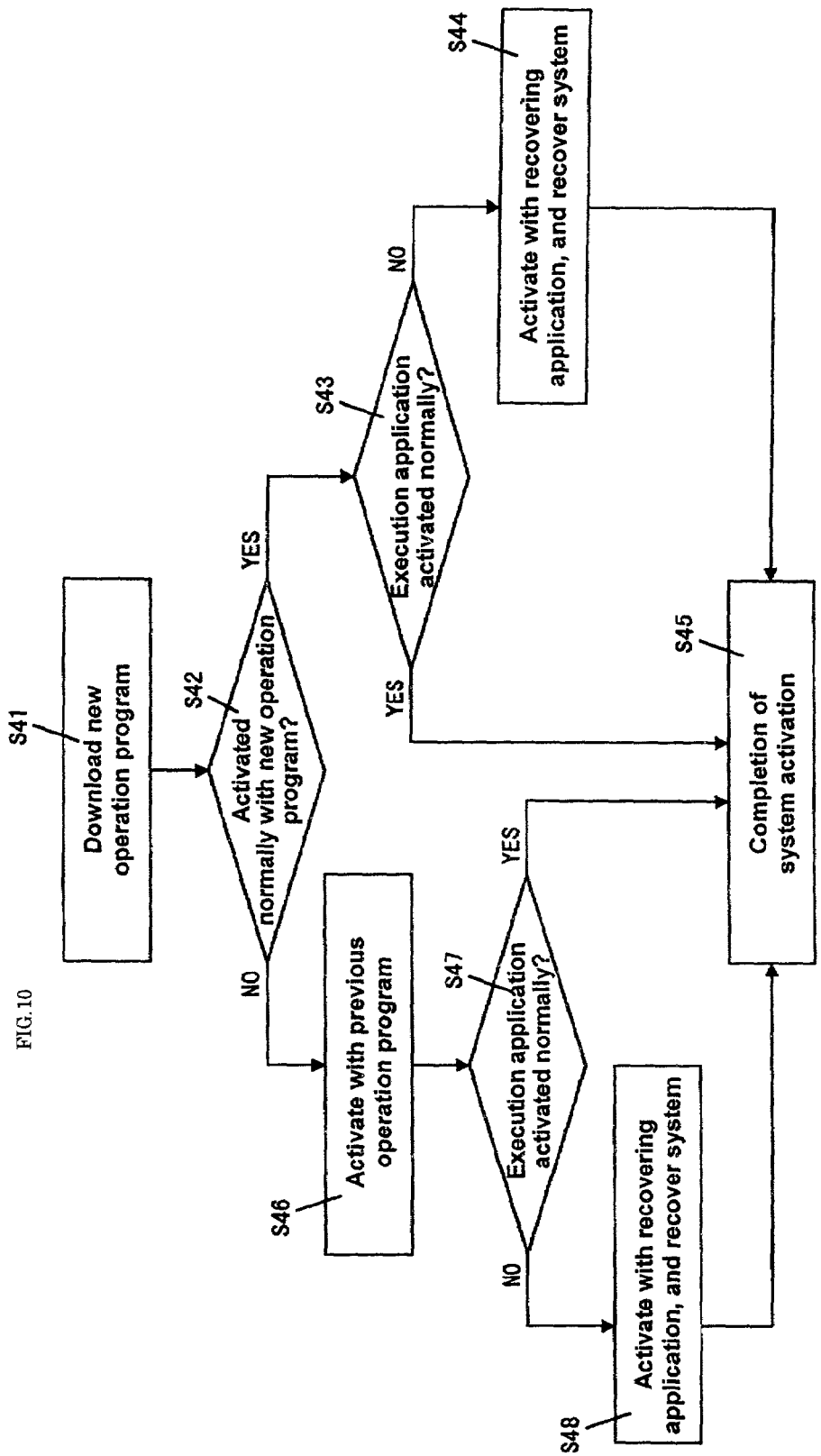
FIG. 10 is a drawing that shows a sequence of an update method in the system construction shown in FIGS. 7 to 9.

In this manner, in the system construction as shown in FIGS. 7 to 9, the remote program updating system of the present invention is executed following the sequence shown in FIG. 10. Referring to the functions in FIG. 9, the following description will discuss the sequence of an updating operation in detail in accordance with FIG. 10, based upon the flow shown in FIG. 5. Here, the informing process (step S37) indicating that the previous operation program, as it is, is operated, shown in FIG. 5, is an additional function; therefore, this process is omitted from FIG. 10. When the new operation program 24 is externally downloaded through the network 35, and stored in either one of the ROMs (step S41, functions f1, f2), the system makes a check as to whether or not the new operation program is activated normally (step S42). In other words, when the new operation program 24 is downloaded, the system checks the new operation program 24 thus stored (function f3), and if there is no abnormality, activates the new operation program 24 (function f4), and makes a check as to whether or not the activated new operation program 24 has been activated normally by checking the boot status register 29 (function f6).

When the new operation program 24 has been activated normally, the execution application 22 is activated on the new operation program 24 that has been activated (function f7), and a check is made as to whether or not the execution application has been activated normally (step S43). In other words, the system makes a check as to whether or not there is any abnormality in the execution application by checking the boot status register 29 (function f9). If the execution application has been activated normally, the activation of the system is completed (completion of the updating operation, step S45).

In contrast, if there is any abnormality in the execution application 22 at step S43, since the CONFIG flag of the boot status register 29 is "1", a software resetting is allowed to function by the overtime of the watch dog timer 28; therefore, when the CONFIG flag of the boot status register 29 is checked, the recovering application 23 is activated. The recovering application 23 thus activated recovers the setting of the system (execution application 22) (step S44, function f8), thereby completing the activation of the system (step S45).

Moreover, in the case when there is any abnormality in the new operation program 24 at step S42, since the BOOT flag of the boot status register 29 is "1", the software resetting is allowed to function by the overtime of the watch dog timer 28; therefore, when the BOOT flag of the boot status register 29 is checked, the system is reactivated by the previous operation program 21 to recover the previous operation program 21 in the system (step S46, function f5). Next, the execution application 22 is activated on the previous operation program 21 (function f7) so that a check is made as to whether or not the execution application 22 has been activated normally (step S47). When the execution application 22 has been activated normally, the system activation is completed (completion of the updating operation, step S45). In contrast, in the case when there is any abnormality in the execution application 22, the software resetting is allowed to function by the overtime of the watch dog timer 28; therefore, when the CONFIG flag of the boot status register 29 is checked, the recovering application 23 is activated to recover the setting of the system (execution application 22) (step S48, function f8), thereby completing the system activation (step S45).

Figure 11:
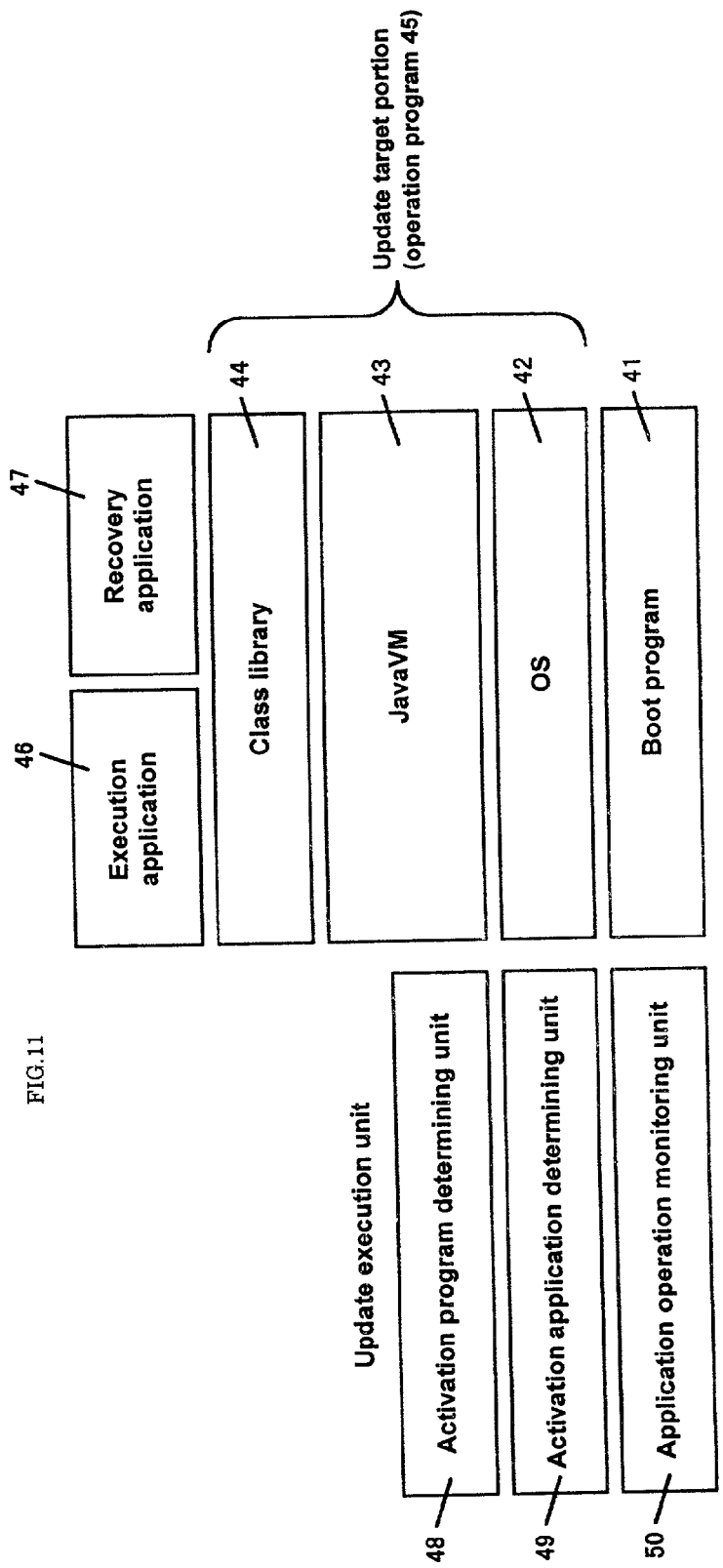
FIG. 11 is a drawing that shows one example of a Java execution environment in which Java VM is being operated on the OS.

Next, a specific explanation is given of a state in which an updating process is carried out under Java execution environment with Java VM (virtual machine) being operated on the OS (operation system). FIG. 11 shows one example of a Java execution environment with Java VM being operated on the OS, and the system is constituted by a boot program 41 that functions at the time of the system activation, an OS 42 for controlling the entire system, a Java VM43 which provides a common platform by absorbing differences in the OS 42, a class library 44 that runs on the Java VM, an execution application 46 for executing application purposes of the apparatus and a recovering application 47 that has a minimum recovering function required. Here, the OS 42, Java VM43 and class library 44 are operation programs 45 that are updating subjects. In this case, the update subjects are limited to operation programs in order to explain the present invention; however, since the operation programs are switched by using the duplicated memories, the execution applications located on the same memory are of course allowed to form subjects for the updating process.

Here, an update execution unit, which updates the above-mentioned operation program 45, is provided with an activation program determining unit 48 which determines which operation program should be activated between the new Java VM and the OS thereof and the previous Java VM and the OS thereof, an activation application determining unit 49 which determines which application program should be activated, and an application operation monitoring unit 50 which monitors the operation of the application thus activated.

Even in the updating system under this environment, the normal resolving function, the recovering trial function, and the first and second ensured recovering functions are achieved; however, with detailed explanations of these functions being omitted, first, referring to FIGS. 12 and 13, an explanation will be given of the flow of the entire system at the time when an operation program is downloaded to upgrade the system. In this system, when the new Java VM and the OS (new operation program) thereof are externally downloaded through a network 35, etc. (step S51), the downloaded Java VM and the OS thereof are stored in a ROM area that is not used by the currently operating Java VM and the OS (previous operation program) (step S52). Next, the system is subjected to a hardware resetting or a software resetting so that the system is reactivated (step S53). In this case, the system activation program determining unit 48 determines which Java VM and the OS thereof should be activated between the new and previous ones by checking the boot status register 29(step S54). When the Java VM and the OS thereof have been determined, the system makes a check as to whether or not the determined Java VM and the OS thereof is normal by using the check sums (step S55). When this checking process makes a judgment that the Java VM and the OS thereof thus determined are not normal, the system switches the Java VM and the OS thereof to be activated to the other Java VM and the OS thereof (step S56).

Thus, when the Java VM and the OS thereof that can be activated normally has been determined, the watch dog timer 28 is activated (step S57), the BOOT flag of the boot status register 29 is inverted (step S58) and the Java VM and the OS thereof are activated (step S59).

Next, when the activation application determining unit 49 has determined the application to be activated (step S60), the application thus determined is loaded (step S61), and the BOOT flag and the CONFIG flag of the boot status register 29 are inverted (S62). With these processes, the BOOT flag, inverted at step S58, is returned to the original state. Moreover, in the case when, before reaching this stage, the Java VM and the OS thereof have been frozen, since the system is subjected to the software resetting due to the time out of the watch dog timer 28, it is possible to judge that the Java VM and the OS thereof are activated normally at this time. Therefore, the watch dog timer 28 is updated (step S63), and the operation of the loaded application is monitored by the application operation monitoring unit 50 (step S64).

Figure 12:
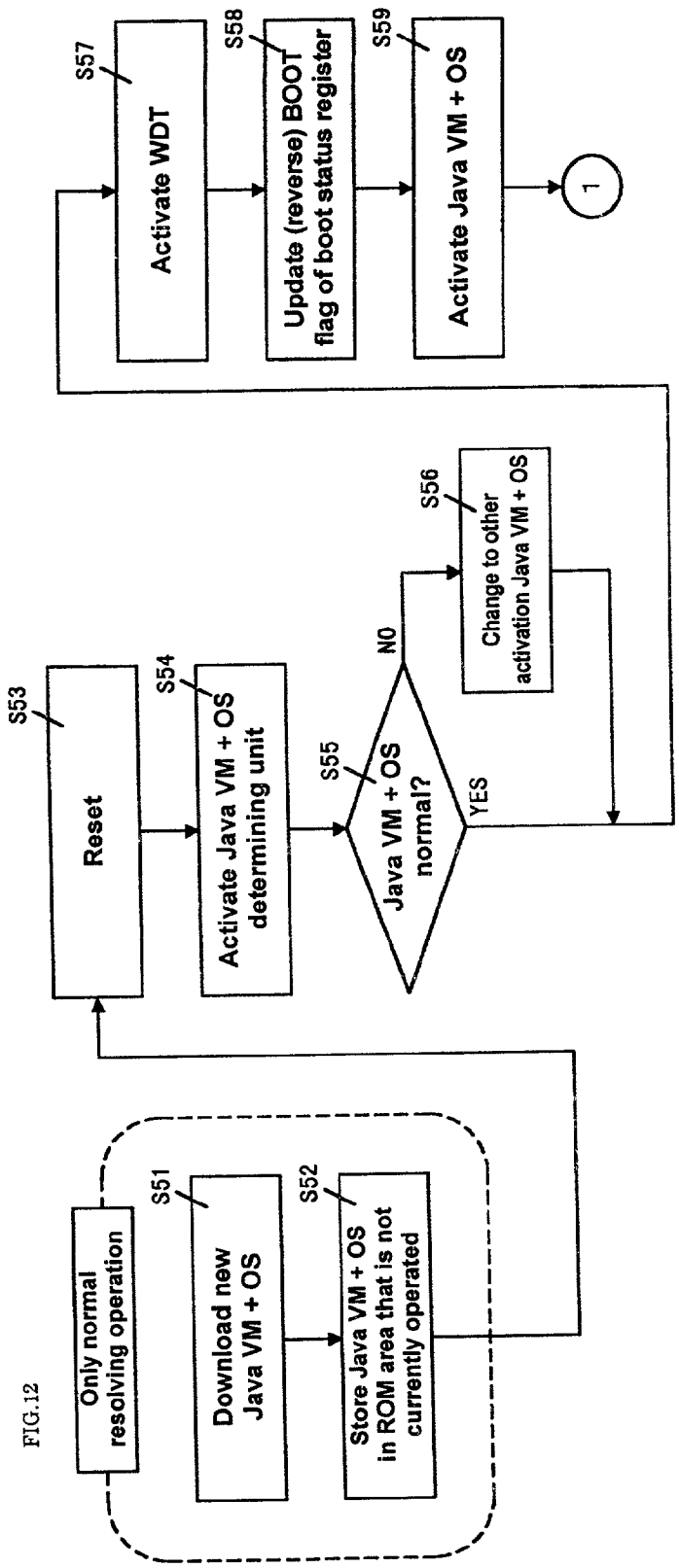
FIG. 12 is a drawing that shows a flow of the entire system in which an operation program is downloaded to upgrade the system.
Figure 13:
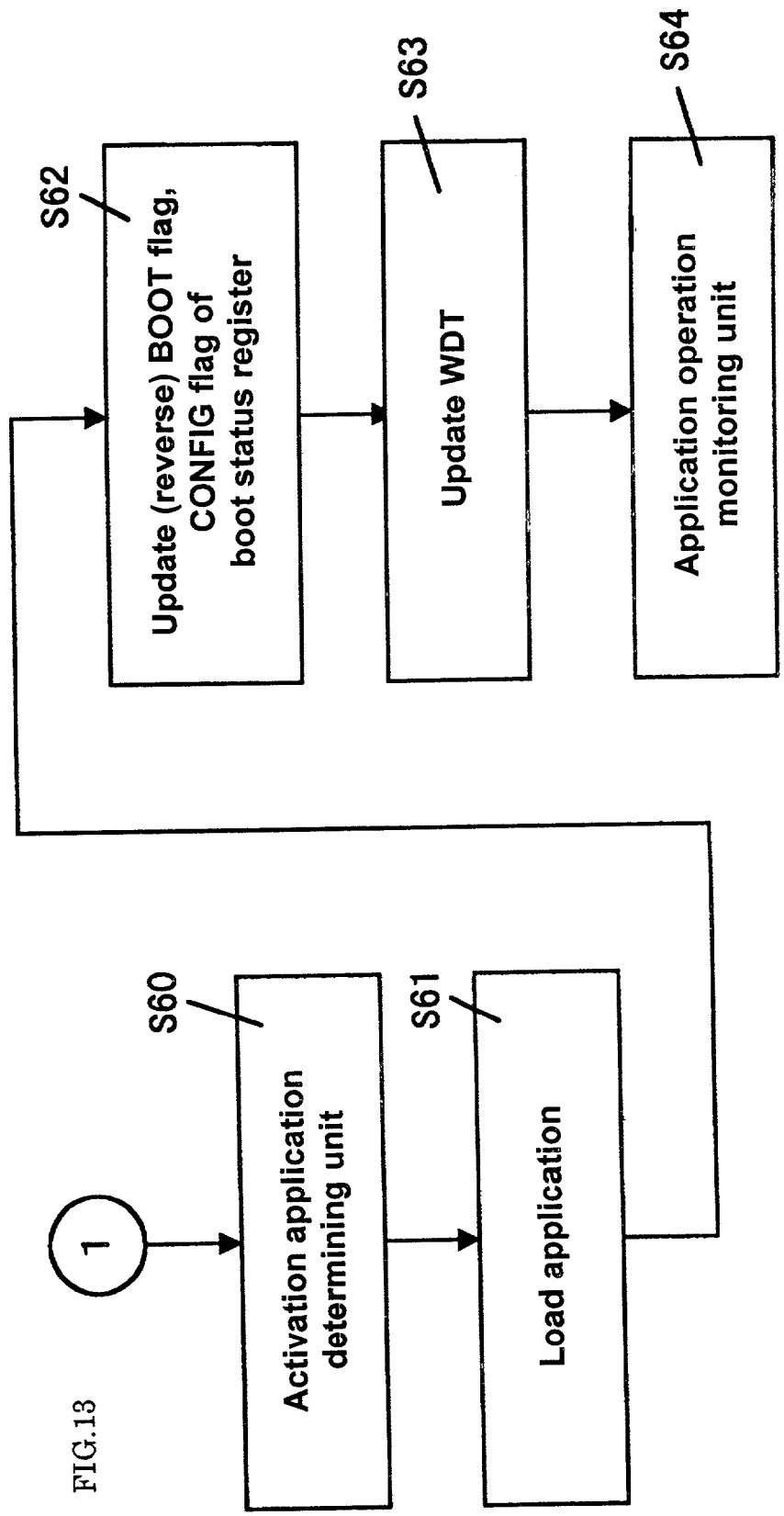
FIG. 13 is a continuous drawing of FIG. 12.

FIGS. 14 to 19 show processing sequences of the normal resolving function, the recovering trial function and the ensured recovering function that are carried out during the processes shown in FIGS. 12 and 13. Here, in FIGS. 14 to 19, the common portion indicates processes in FIGS. 12, 18 that are in common with the normal resolving function, the recovering trial function and the ensured recovering function. First, referred to FIG. 14, an explanation will be given of processes of the activation program determining unit 48 in the normal resolving function. After the BOOT flag of the boot status register 29 has been inverted at step S58 in FIG. 12, the activation program determining unit 48 checks the BOOT flag of the boot status register 29 (step S71) Then, the activation program determining unit 48 makes a determination as to whether or not the BOOT flag is inverted (step S72), and if this is inverted, it is determined that the Java VM and the OS thereof prior to the downloading process should be used for the activation (step S74), and if the BOOT flag is not inverted, it is determined that the downloaded Java VM and the OS thereof should be used for the activation (step S73). In the case when the downloaded Java VM and the OS thereof has no abnormality with the normal resolving function being operated thereon, since the BOOT flag is not inverted, the activation program determining unit 48 determines that the downloaded Java VM and the OS thereof should be activated (step S73).

Figure 15:
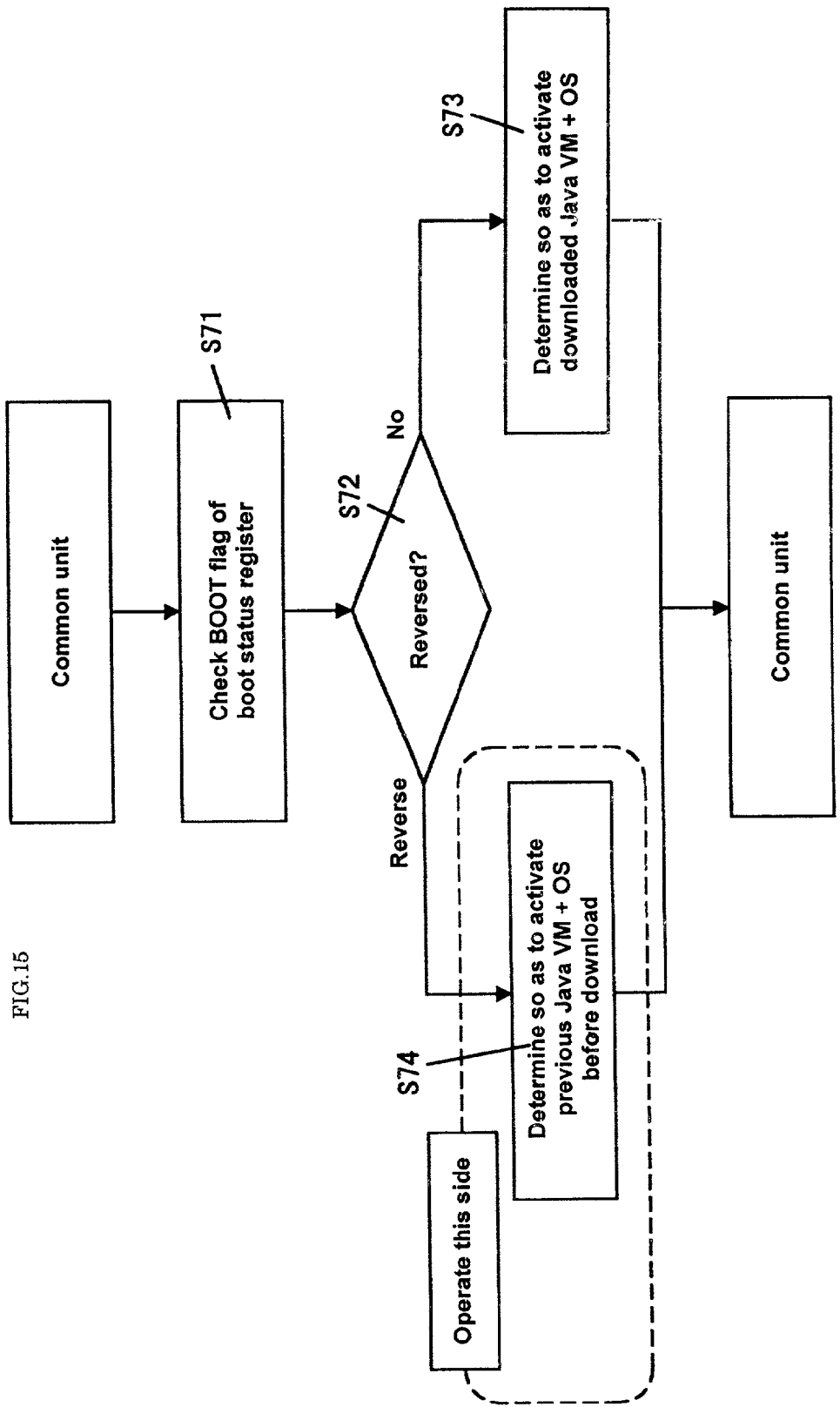
FIG. 15 is a drawing that explains processes of the activation program determining unit in a recovering trial function.

Moreover, FIG. 15 explains processes of the activation program determining unit 48 in the recovering trial function. After the BOOT flag of the boot status register 29 has been inverted at step S58 in FIG. 12, the activation program determining unit 48 checks the BOOT flag of the boot status register 29 (step S71). Then, the activation program determining unit 48 makes a determination as to whether or not the BOOT flag is inverted (step S72), and if the BOOT flag is inverted, it is determined that the Java VM and the OS thereof prior to the downloading process should be used for the activation (step S74), and if the BOOT flag is not inverted, it is determined that the downloaded Java VM and the OS thereof should be used for the activation (step S73). In the case when, if there is any abnormality in the downloaded Java VM and the OS thereof, the recovering trial function is exerted, during the normal resolving function, prior to reaching step S62 of FIG. 13, the watch dog timer 28 takes a time-out, thereby resetting the software, with the BOOT flag being inverted; therefore, the activation program determining unit 48 determines that the Java VM and the OS thereof prior to the downloading process should be activated (step S74).

Figure 16:
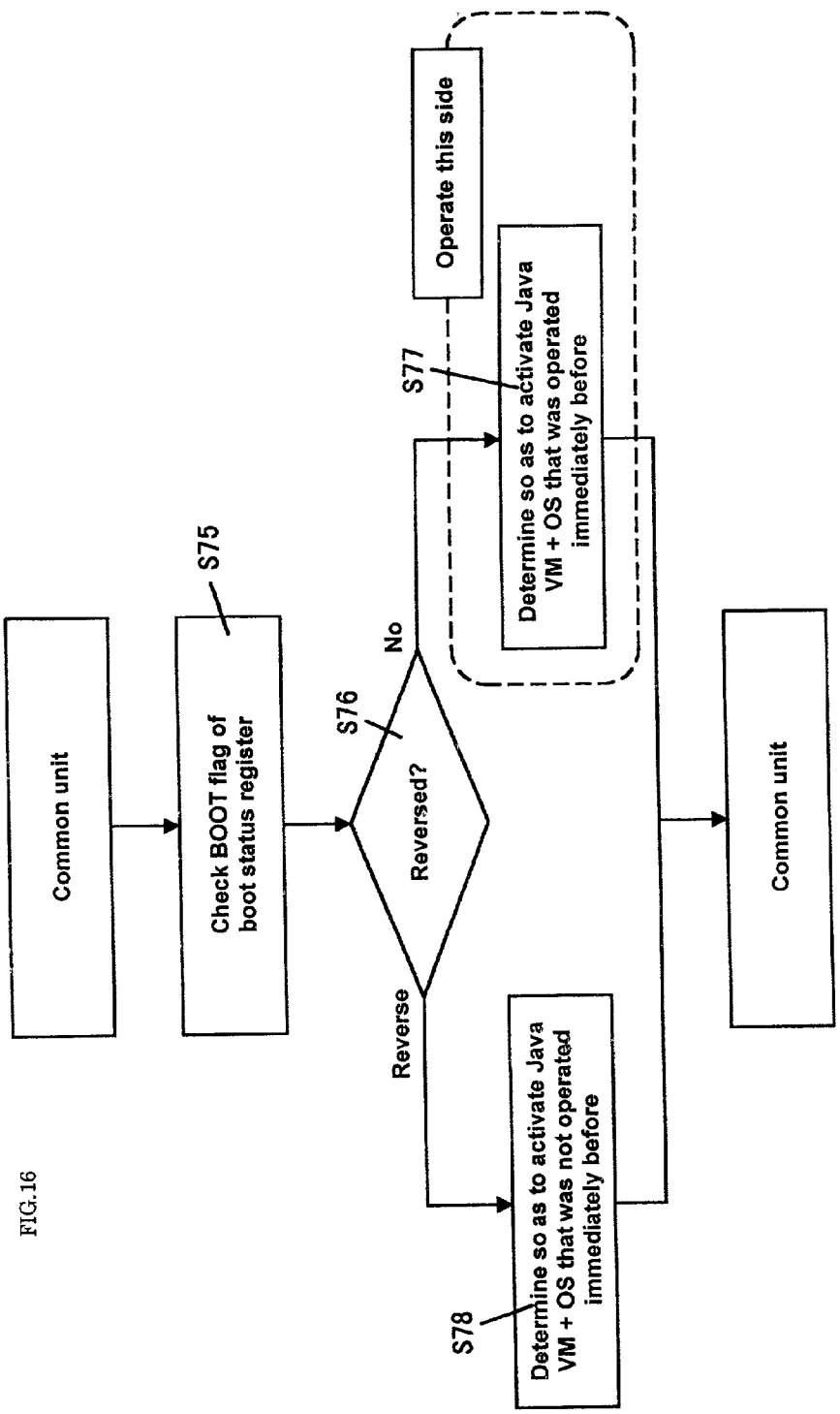
FIG. 16 is a drawing that explains processes of the activation program determining unit in an ensured recovering function.

Moreover, FIG. 16 explains processes of the activation program determining unit 48 in the ensured recovering function. After the BOOT flag of the boot status register 29 has been inverted at step S58 in FIG. 12, the activation program determining unit 48 checks the BOOT flag of the boot status register 29 (step S75). Then, the activation program determining unit 48 makes a determination as to whether or not the BOOT flag is inverted (step S76), and if the BOOT flag is inverted, it is determined that the Java VM and the OS thereof that have not been operated immediately before should be activated (step S78), and if the BOOT flag is not inverted, it is determined that the Java VM and the OS thereof that have been operated immediately before should be activated (step S77). In the case when the ensured recovering function is exerted, since the normal activation of the Java VM and the OS thereof is confirmed in both of the first ensured recovering function and the second ensured recovering function, the BOOT flag of the boot status register 29 is not inverted; therefore, the activation program determining unit 48 determines that the Java VM and the OS thereof that have been operated immediately before (in the case of the first ensured recovering function, the downloaded Java VM and the OS thereof, in the case of the second ensured recovering function, the Java VM and the OS thereof prior to the downloading process) should be activated (step S77)

Figure 17:
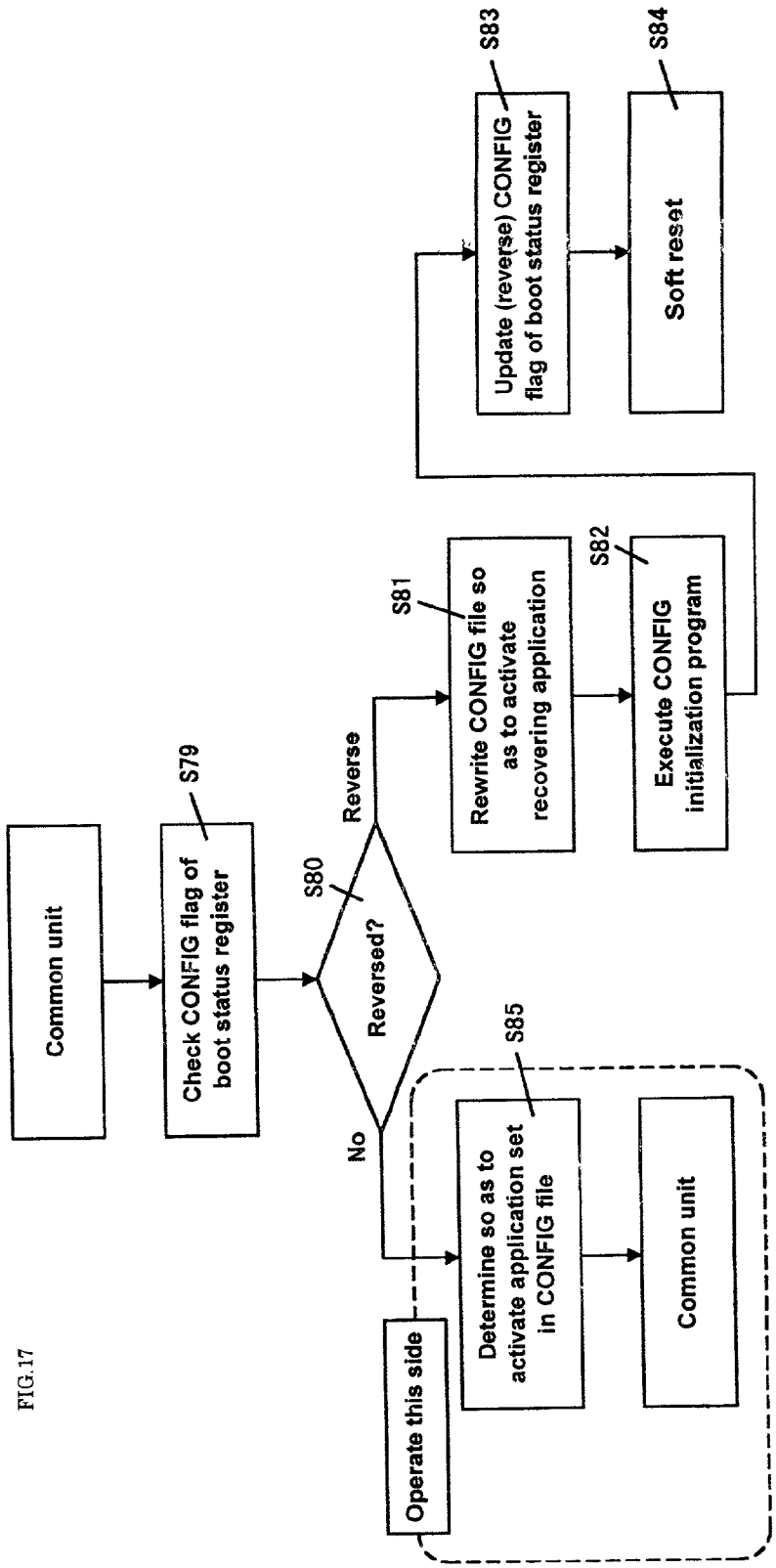
FIG. 17 is a drawing that explains processes of an activating application determining unit in the normal resolving function and recovering trial function.

Next, referring to FIG. 17, the following description will explain processes of the activation application determining unit 49 in the normal resolving function and the recovering trial function. After the CONFIG flag of the boot status register 29 has been inverted at step S62 in FIG. 13, the activation application determining unit 49 checks the CONFIG flag of the boot status register 29 (step S79). Then, the activation application determining unit 49 makes a determination as to whether or not the CONFIG flag is inverted (step S80), and if the CONFIG flag is inverted, rewrites the CONFIG file (file in which a definition for specifying a program to be operated at the time of activation is written) so as to activate the recovering application (step S81); thus, the CONFIG of the system is initialized to execute the program (step S82), and after the CONFIG flag of the boot status register 29 has been inverted (step S83), the software of the system is reset (step S84). If the CONFIG flag is not inverted at step S80, the activation application determining unit 49 determines so that the application set by the CONFIG flag should be activated (step S85). In the case when the normal resolving function and the recovering trial function are operated, since the CONFIG flag is not inverted, the activation application determining unit 49 determines that the application set by the CONFIG flag should be activated (step S85).

Figure 18:
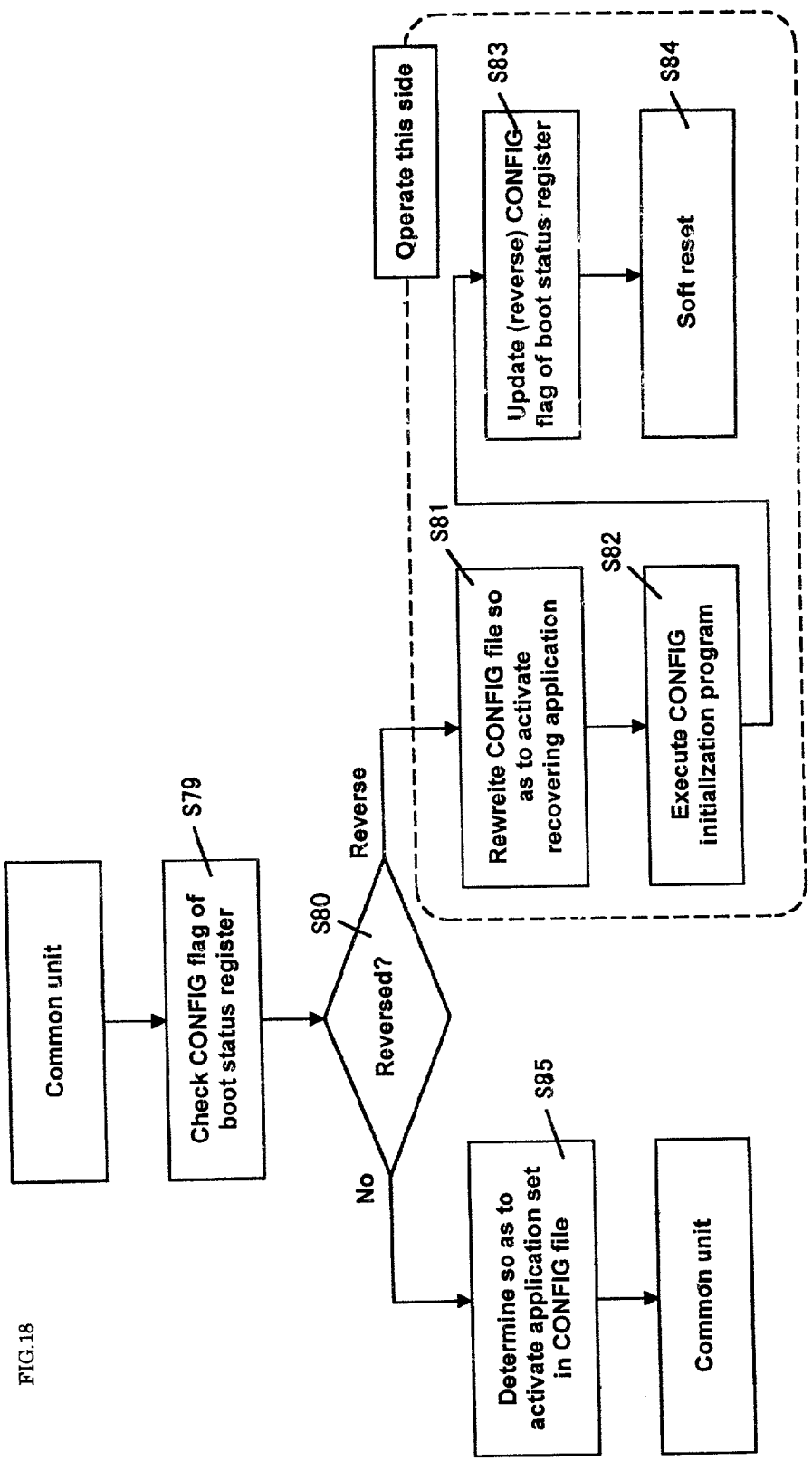
FIG. 18 is a drawing that explains processes in the activating application determining unit in the ensured recovering function.

Moreover, FIG. 18 explains processes of the activation application determining unit 49 in the ensured recovering function. After the CONFIG flag of the boot status register 29 has been inverted at step S62 in FIG. 13, the activation application determining unit 49 checks the CONFIG flag of the boot status register 29 (step S79). Then, the activation application determining unit 49 makes a determination as to whether or not the CONFIG flag is inverted (step S80), and if the CONFIG flag is inverted, rewrites the CONFIG file so as to activate the recovering application (step S81); thus, the CONFIG initializing program is executed (step S82), and after the CONFIG flag of the boot status register 29 has been inverted (step S83), the software of the system is reset (step S84). If the CONFIG flag is not inverted at step S80, the activation application determining unit 49 determines so that the application set by the CONFIG flag should be activated (step S85). In the case when the first or second ensured recovering function is operated, the normal operation of the Java VM and the OS thereof is confirmed by the normal resolving function and the recovering trial function; however, since the CONFIG flag is inverted due to the watch dog timer 28 that takes a time-out in the application operation monitoring unit 50, the activation application determining unit 49 rewrites the CONFIG file so as to activate the recovering application 23 (step S81), and the CONFIG flag initializing program is executed (step S82) so that the CONFIG flag of the boot status register 29 is inverted (step S83). Thus, the CONFIG flag, inverted at step S58 in FIG. 12, is returned to the original state. Moreover, the activation application determining unit 49 subjects the system to a software resetting (step S84). When, after having been subjected to the software resetting, the system sequence again comes to this step, the CONFIG flag is returned to its original state; therefore, it is determined that the application (recovering application 23), set by the CONFIG file, should be activated.

Next, referring to FIG. 19, an explanation will be given of processes of the application operation monitoring unit 50 in the normal resolving function, recovering trial function and ensured recovering function. After the watch dog timer 28 has been reset at step S63 in FIG. 13 (step S86), the application operation monitoring unit 50 carries out a normal process (step S87) so as to make a check as to whether or not the recovering application 23 is activated (step S88). In the case when the recovering application 23 is not activated, a check is made as to whether or not the watch dog timer 28 has taken a time-out, and in the case when the recovering application 23 is activated, a check is not made on the watch dog timer 28, and the sequence returns to the process at step S86, thereby resetting the watch dog timer 28. Therefore, since the recovering application 23 is activated when the ensured recovering function is exerted, the watch dog timer 28 never takes a time-out. In contrast, in the case of the normal resolving function or the recovering trial function with the execution application 22 being executed, the application operation monitoring unit 50 checks the time-out of the watch dog timer 28 (step S89), and if the watch dog timer 28 has taken a time-out, the system is subjected to a software resetting (step S90) and the sequence proceeds to the ensured recovering function, while if it has not taken a time-out, the sequence returns to the process at step S86, thereby resetting the watch dog timer 28.

Figure 14:
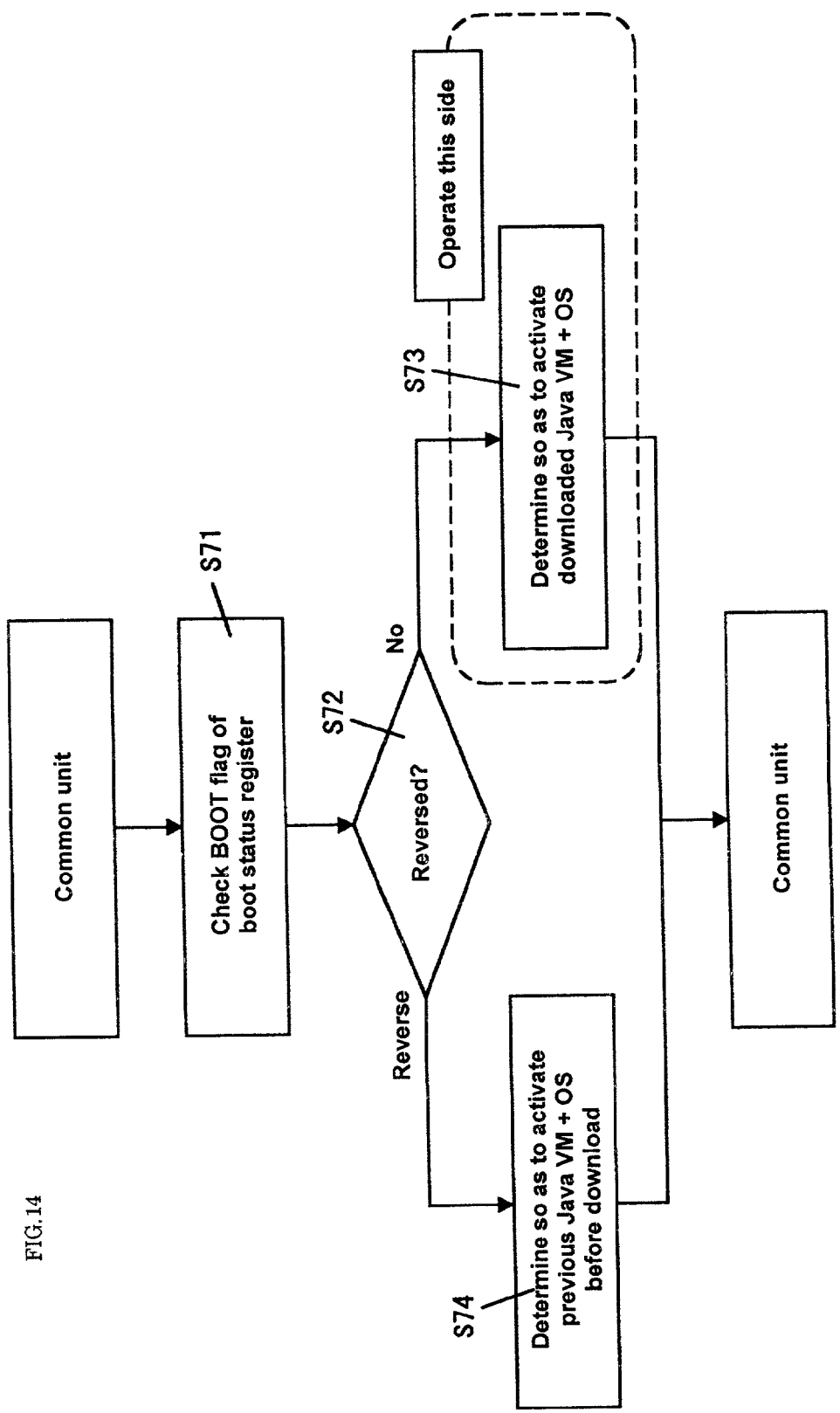
FIG. 14 is a drawing that explains processes of an activation program determining unit in a normal resolving function.
Figure 19:
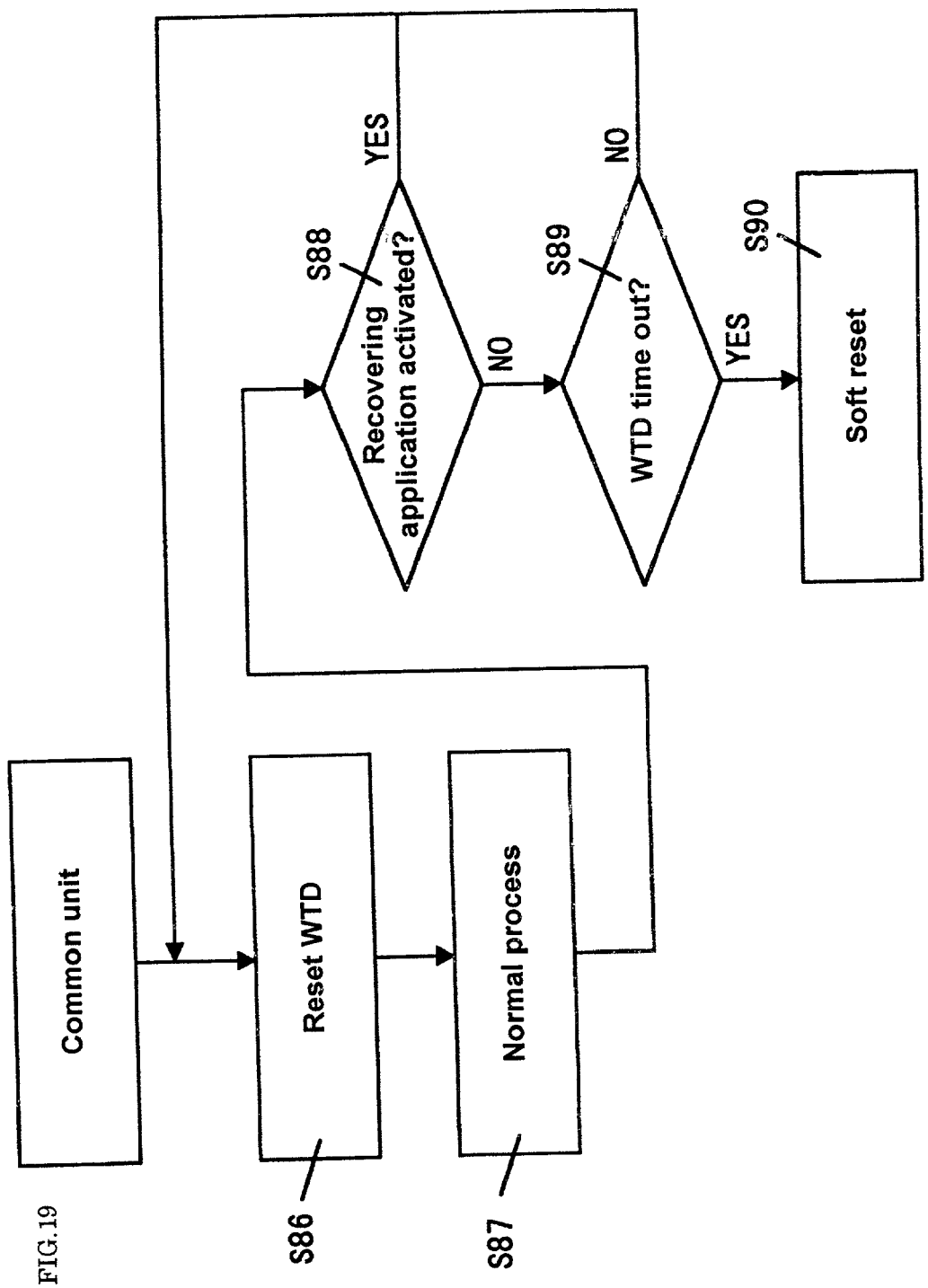
FIG. 19 is a drawing that explains processes in the application operation monitoring unit in the normal resolving function, recovering trial function and ensured recovering function.

Therefore, in the case when the downloaded Java VM+OS (new operation program) are activated normally with the execution application 22 also being activated normally (in the case of the normal resolving function), the corresponding processes are shown as a flow in FIGS. 14, 17 and 19. Moreover, in the case when the downloaded Java VM+OS (new operation program) are not activated normally and the system is recovered normally by using the Java VM+OS (previous operation program) prior to the downloading process (in the case of recovering trial function), the corresponding processes are shown as a flow in FIGS. 15, 17 and 19. Furthermore, in the normal resolving function, in the case when, although the downloaded Java VM+OS (new operation program) is activated normally, the execution application 22 is not operated normally but the system is positively recovered by the recovering application 23 (in the case of the first ensured recovering function), the corresponding processes are shown as a flow in FIGS. 16, 18 and 19. Moreover, in the ensured recovering function, in the case when the execution application 22 is not operated normally by using the Java VM+OS (previous operation program) prior to the downloading process but the system is positively recovered by the recovering application 23 (in the case of the second ensured recovering function), the corresponding processes are shown as a flow in FIGS. 16, 18 and 19. Thus, the three stages of the normal resolving function, the recovering trial function and the ensured recovering function are carried out step by step so that the objective of the present invention is achieved.

Figure 20:
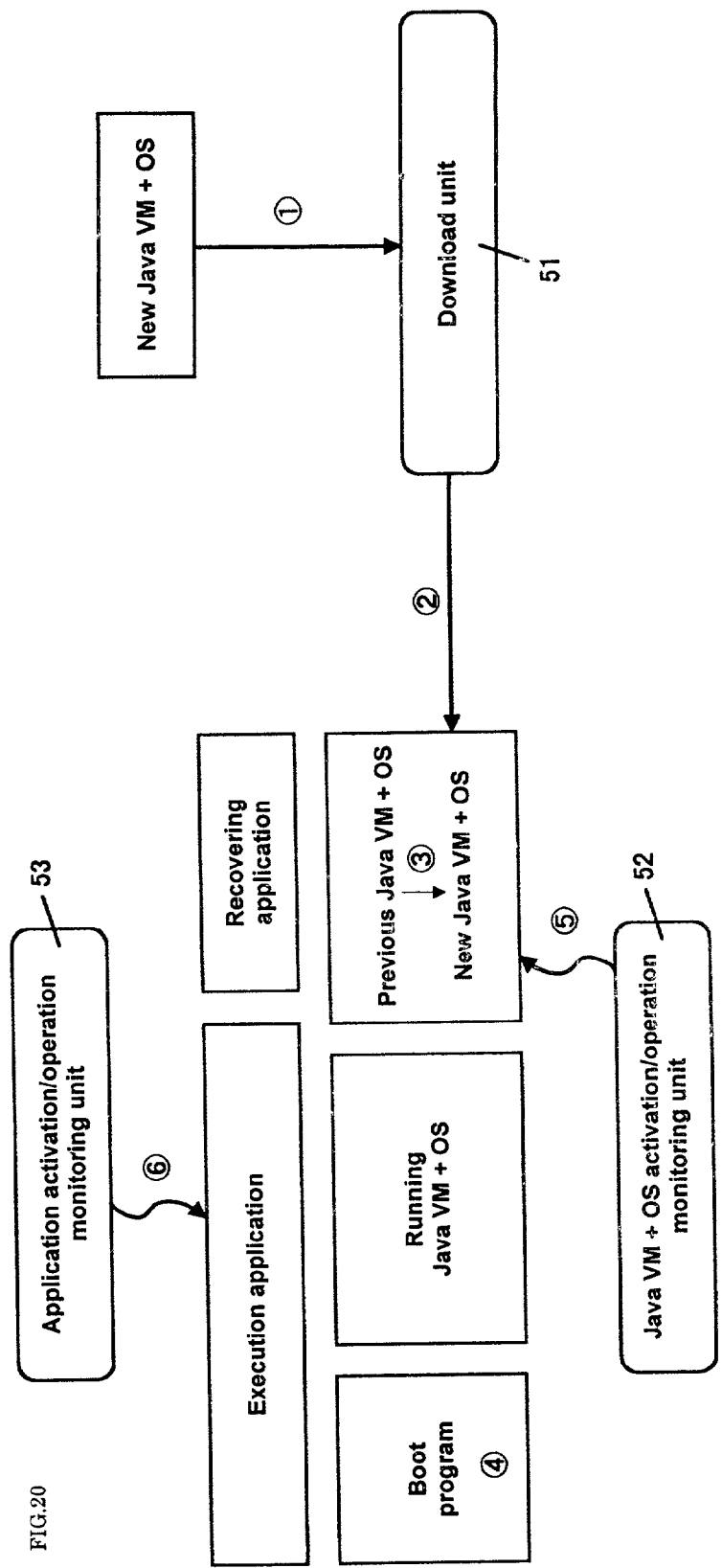
FIG. 20 is a flow chart that shows a flow of software in the normal resolving function.

Next, FIG. 20 shows the flow of software in the normal resolving function. As shown in this Figure, in the case of the normal resolving function, the new Java and OS thereof (new operation program 24) are downloaded by the download unit 51, and the Java VM and OS thereof (previous operation program 21), which are currently not operated, are replaced by the new Java and OS thereof. Next, a boot program is activated. The Java VM+OS activation/operation monitoring unit 52 determines the Java VM and OS thereof to be activated, and checks them for any failure or any freezing, and if there is any freezing, executes the recovering trial function. Moreover, the application activation/operation monitoring unit 53 activates the execution application 22, and checks it for any freezing, and if there is any freezing, subjects it to a software resetting so that the first ensured recovering function is executed.

Figure 21:
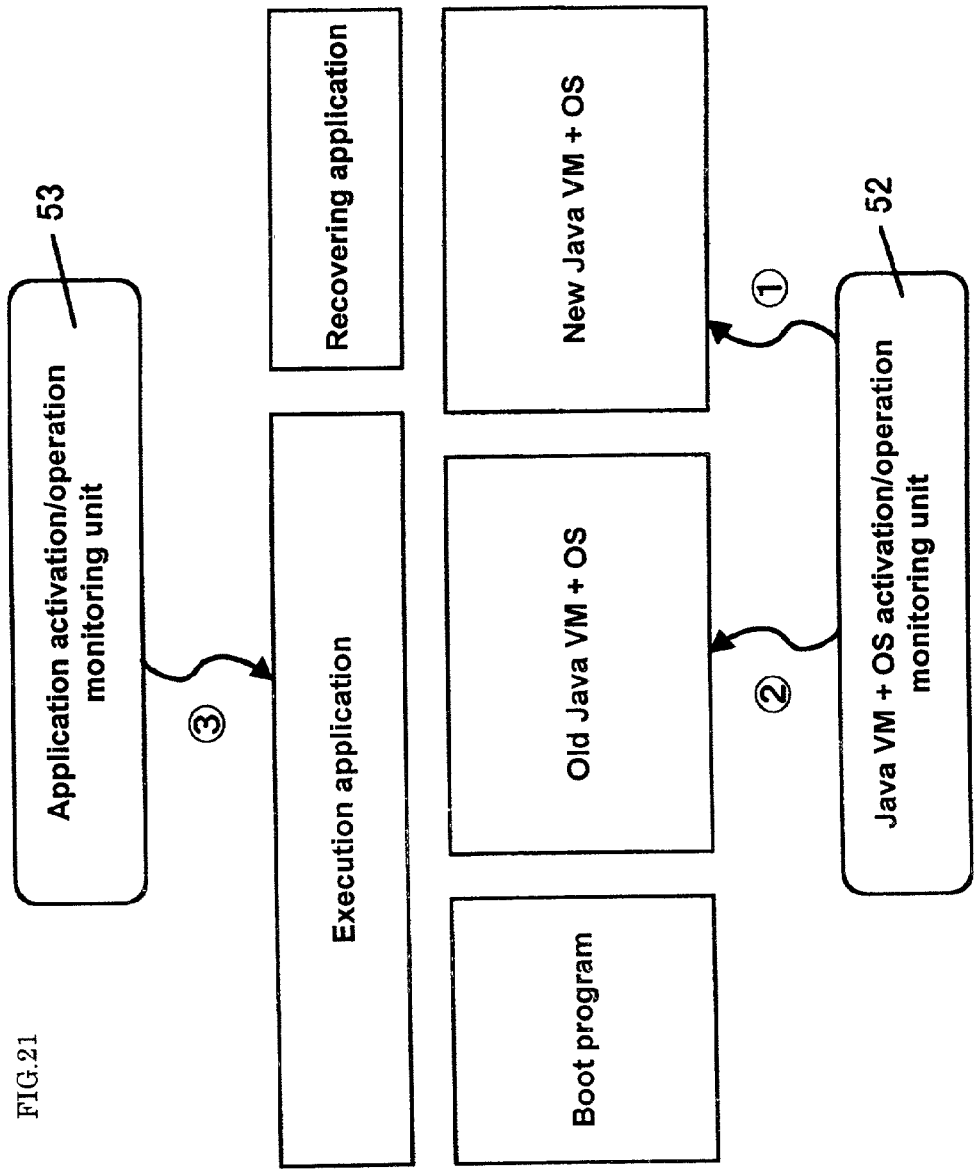
FIG. 21 is a drawing that shows a flow of software in the recovering trial function.

Here, FIG. 21 shows a flow of software in the recovering trial function. In the case when, upon activation of the new Java VM and OS thereof, there is any freezing with the result that the system is subjected to a software resetting, Java VM+OS activation/operation monitoring unit 52 reactivates the previous Java VM+OS thereof (previous operation program) that have been operated prior to the downloading process. Next, the application activation/operation monitoring unit 53 activates the execution application 22 and checks it for any possibility of freezing. If there is any freezing, it subjects the system to a software resetting so that the second ensured recovering function is executed.

Figure 22:
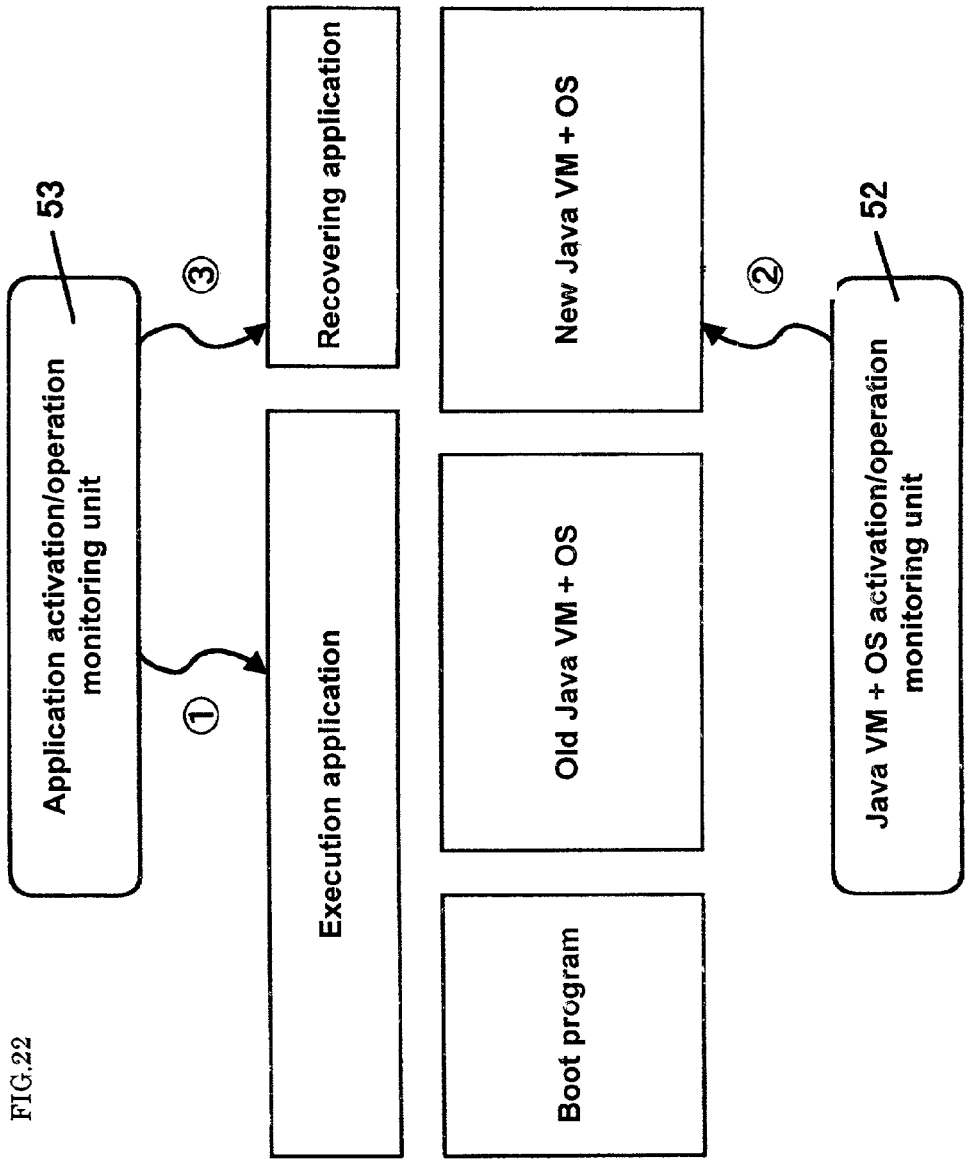
FIG. 22 is a drawing that shows a flow of software in a first ensured recovering function.

Moreover, FIG. 22 shows a flow of software in the first ensured recovering function. The application activation/operation monitoring unit 53 monitors the execution application 22 so that, if there is any freezing upon operation of the execution application by using the new Java VM and OS thereof with the result that the system is subjected to a software resetting, the Java VM+OS activation/operation monitoring unit 52 reactivates the new Java VM and OS thereof since the new Java VM and OS thereof have been confirmed to be activated normally. Then, the application activation/operation monitoring unit 53 activates the recovering application, thereby completing the recovering process.

Figure 23:
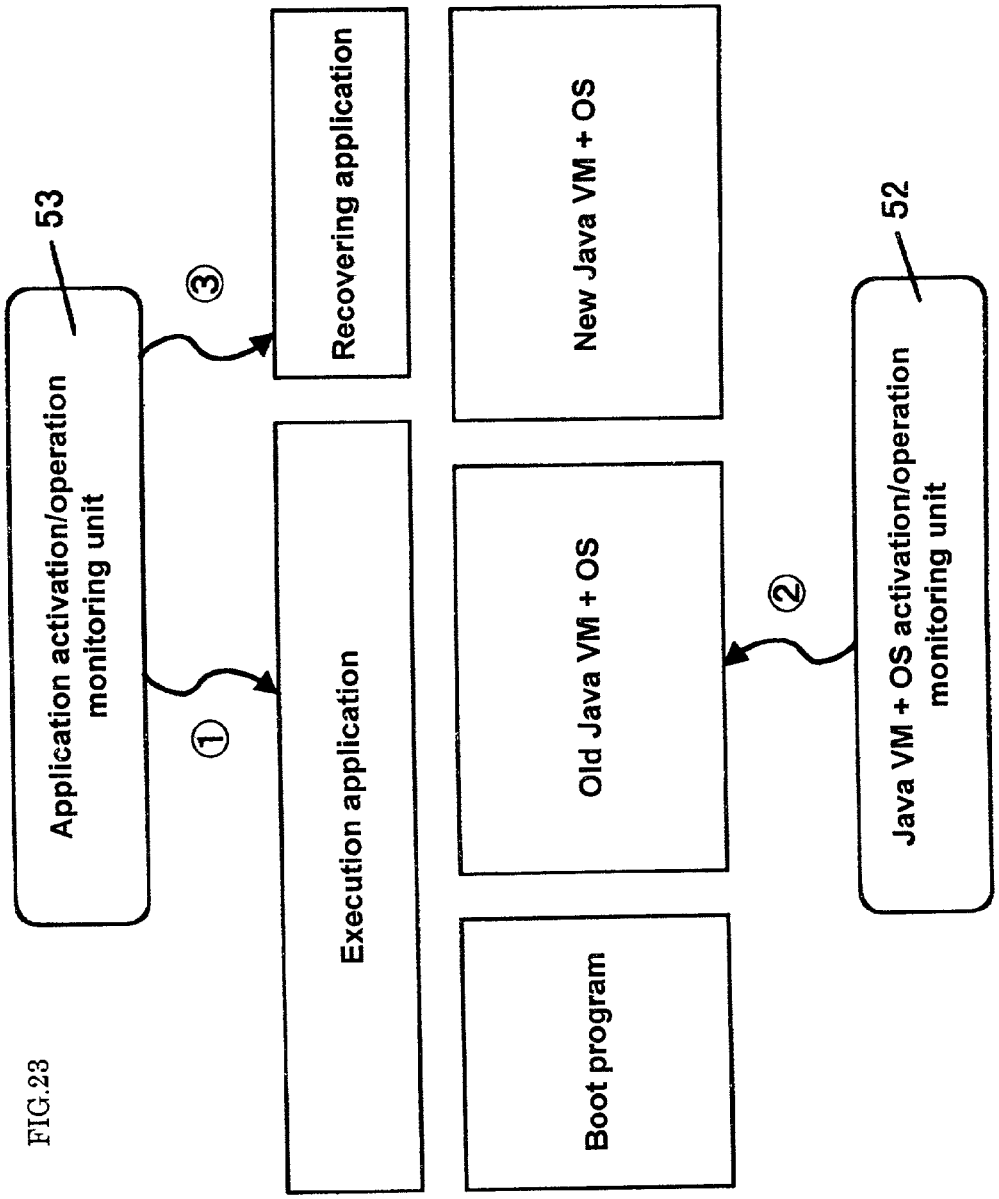
FIG. 23 is a drawing that shows a flow of software in a second ensured recovering function.

Furthermore, FIG. 23 shows a flow of software in the second ensured recovering function. The application activation/operation monitoring unit 53 monitors the execution application 22 so that, if there is any freezing upon operation of the execution application by using the previous Java VM and OS thereof with the result that the system is subjected to a software resetting, the Java VM+OS activation/operation monitoring unit 52 reactivates the previous Java VM and OS thereof since the previous Java VM and OS thereof have been confirmed to be activated normally. Then, the application activation/operation monitoring unit 53 activates the recovering application 23, thereby completing the recovering process.

Figure 24:
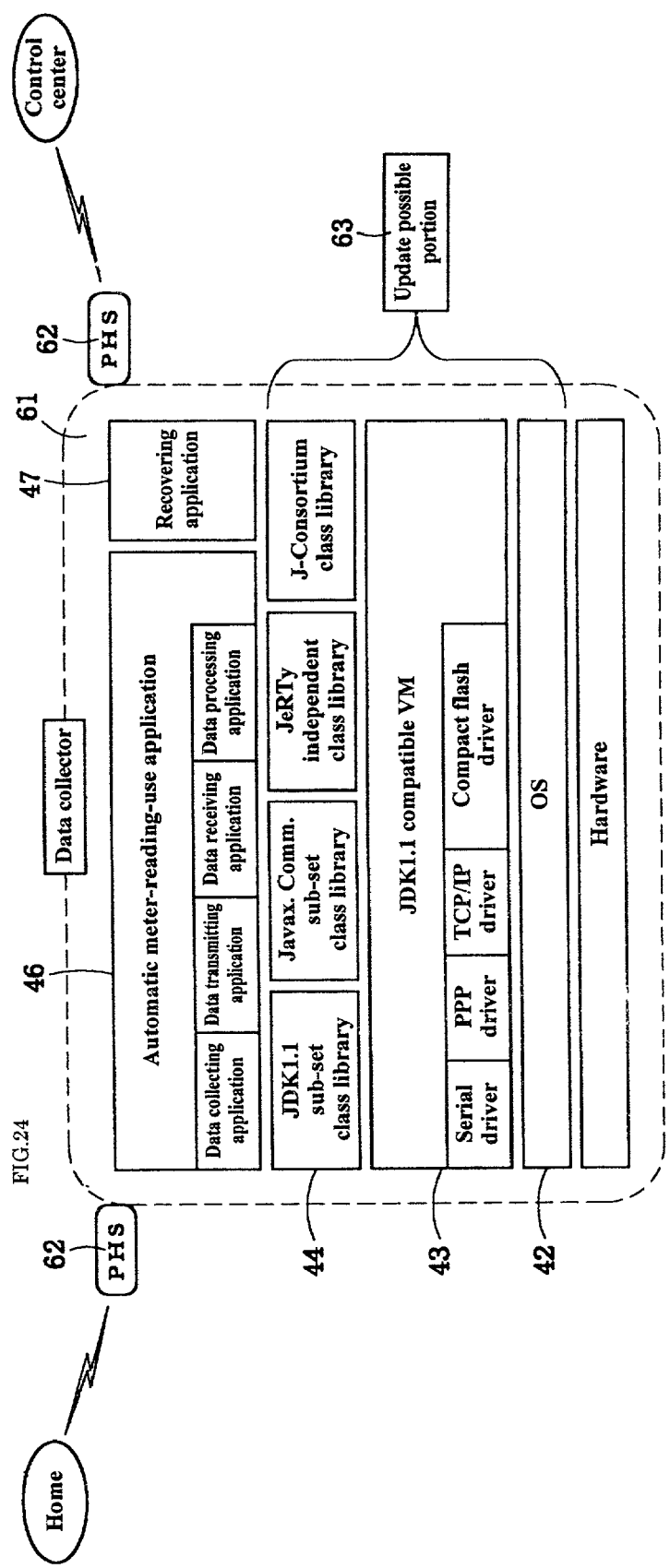
FIG. 24 is a module structural drawing of an automatic meter reading system (data collector).
Figure 25:
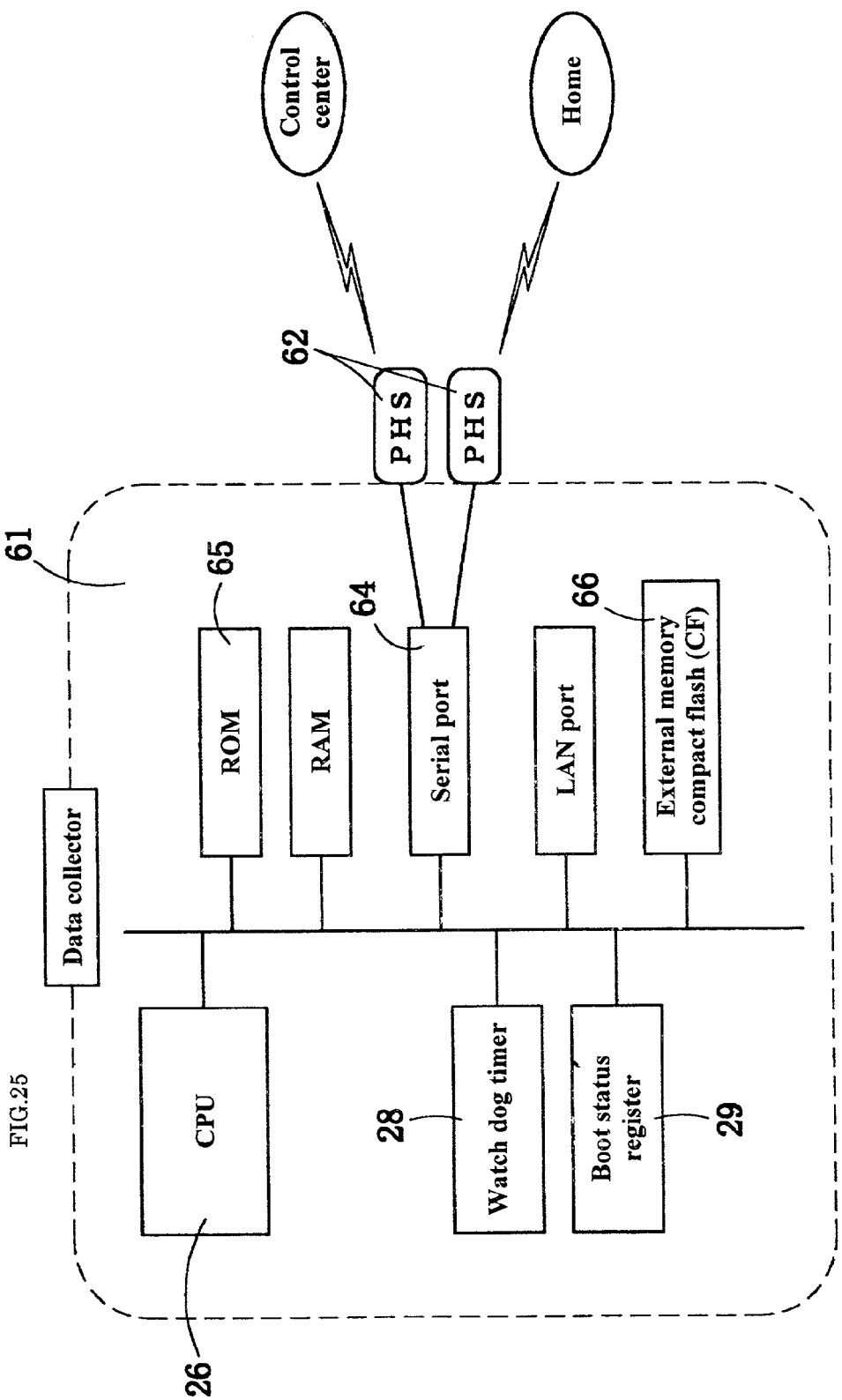
FIG. 25 is a hardware structural drawing of the automatic meter reading system of FIG. 24.
Figure 26:
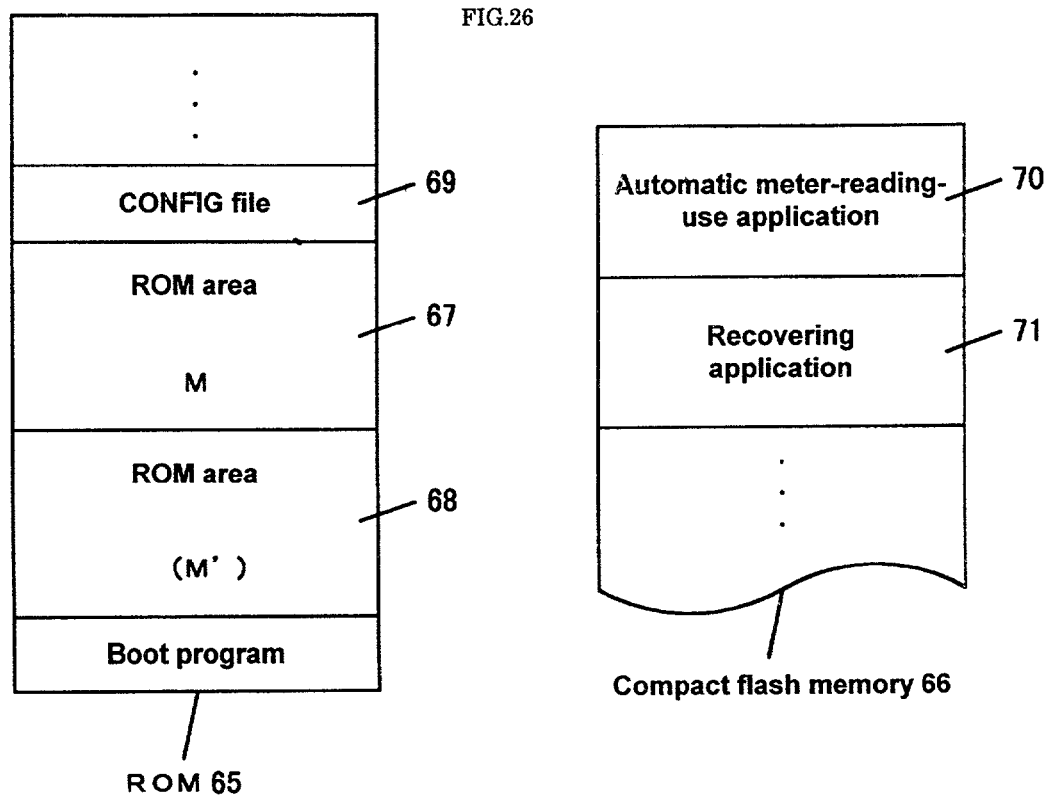
FIG. 26 is a drawing that shows a state of a ROM and a compact flash memory of FIG. 25.

FIG. 24 is a structural drawing that shows a module of an automatic meter-reading system (data collector) 61. This automatic meter-reading system 61 regularly operates data communications with the home and the control center through a PHS 62. Here, an update applicable portion 63, shown in FIG. 24, can be updated by data given from the control center. FIG. 25 is a hardware block diagram of the automatic meter-reading system 61 of FIG. 24. The PHS 62 is connected to a serial port 64 through a PPP driver and a serial driver. An activation program, a boot program and CONFIG files are stored in a ROM 65. Moreover, an automatic meter-reading application 70, a recovering application 71, data obtained by the automatic meter-reading operation, etc. are stored in a compact flash memory (CF) 66 that is an external storing device. FIG. 26 shows a state of the ROM 65 and the compact flash memory 66 of FIG. 25. An activation program M is activated in a ROM area 67 in the ROM 65 shown in FIG. 26 so that the automatic meter-reading application is operated. When a bug fixing operation, a software-based functional addition or a driver addition by adding hardware (device) is carried out in the update applicable portion 63 in FIG. 24, the corresponding portion of the activation program M is revised, and compiled. Supposing that the activation program that has been revised and compiled is M', the activation program M' is stored in the ROM area 68 of the ROM 65 in FIG. 26 through a network, and the system is reactivated from the ROM area 68. Moreover, in the case when there is a failure in the activation of the activation program M', the system is reactivated by using the program M in the ROM area 67. In the event of a failure in activation of the automatic meter-reading application 70 due to a data breakdown in the CONFIG file 69, the recovering application 71 stored in the compact flash memory 66 of FIG. 26 is used for recovering data, and the system is reactivated by using an application having the minimum function required for activation. Thus, an automatic updating process is carried out, and the updating process that is completely free from freezing is achieved. Here, in addition to the function for changing the setting of activation, the recovering application may be provided as an application for maintaining the minimum communication function such as telnet and FTP, or may include a plurality of recovering applications. Required recovering applications may be started by using BOOT flags depending on situations. For example, a recovering application is allowed to have a communication function so that, even after almost all functions have been frozen, the freezing is released by a remote control operation using the communication function; thus, it becomes possible to prevent freezing at the time of updating.

We claim:

1. A program update apparatus for updating an operation program on which an application program is executed, comprising:

storage means for separately storing at least two operation programs;

activating means for selecting and activating one of the operation programs, wherein the selected operation program configures a setting required for execution of the application program;

first failure detecting means for detecting a failure in activation of the selected operation program;

second failure detecting means for detecting a failure in activation of the application program executed on the selected operation program, wherein the application program requires the setting configured by the selected operation program for the execution thereof;

a recovering application which resets the setting configured by the selected operation program; and informing means which gives information to an external device outside the program upgrade apparatus, wherein, in the case when the first failure detecting means detects any failure in the activation of the selected operation program, the activating means selects another operation program to switch over from the selected operation program, and in the case when the second failure detecting means detects any failure in the activation of the application program, the recovering application resets the setting configured by the selected operation program, and wherein, in the case when the updating process of the operation program is not carried out correctly, by the informing means, the information indicating the incorrect updating process is given to an external device outside the program upgrade apparatus.

2. A method for updating an operation program on which an application program is executed, comprising:

operating a first operation program, stored in a first storage area, to execute the application program, wherein the application program uses a first setting configured by the first operation program;

storing a second operation program in a second storage area formed separately from the first storage area;

activating the second operation program to switch over from the first operation program, wherein a second setting used for execution of the application program is configured by the second operation program;

detecting a failure in activation of the second operation program;

detecting a failure in activation of the application program;

in the case when a failure is detected in the activation of the second operation program, activating a first operation program to switch over from the second operation program;

in the case when a failure is detected in the activation of the application program, activating a recovering application which resets a setting used for execution of the application program and resetting the second setting to the first setting; and in the case when the updating process of the operation program is not carried out correctly, giving the information indicating the incorrect updating process to an external device.

* * * * *